United States Patent
Sakita

(10) Patent No.: US 6,457,452 B1
(45) Date of Patent: *Oct. 1, 2002

(54) MECHANISM FOR INTERCONNECTING FIRST-AND SECOND-SHAFTS OF VARIABLE SPEED ROTATION TO A THIRD SHAFT

(76) Inventor: Masami Sakita, P.O. Box 61089, Palo Alto, CA (US) 94306

(*) Notice: Subject to any disclaimer, the term of this patent is extended or adjusted under 35 U.S.C. 154(b) by 0 days.

This patent is subject to a terminal disclaimer.

(21) Appl. No.: 10/124,772

(22) Filed: Apr. 17, 2002

Related U.S. Application Data

(62) Division of application No. 09/898,983, filed on Jul. 3, 2001
(60) Provisional application No. 60/289,240, filed on May 7, 2001.

(51) Int. Cl.[7] ............................................. F02N 17/02
(52) U.S. Cl. ........................ 123/245; 74/437; 74/436; 74/435; 74/393; 475/198
(58) Field of Search ........................... 123/245; 74/437, 74/436, 435, 393; 475/198

(56) References Cited

U.S. PATENT DOCUMENTS 88,215 A    3/1869  Ruggles ...................... 418/36

(List continued on next page.)

FOREIGN PATENT DOCUMENTS

| DE | 3501779 A1 | 7/1986 | |
|---|---|---|---|
| JP | 361266866 A | * 11/1986 | .................. 74/437 |
| JP | 58-79623 | 5/1987 | |
| JP | 6002559 A | 1/1994 | |
| SU | 589192 | 1/1978 | |

*Primary Examiner*—Thomas Denion
*Assistant Examiner*—Thai-Ba Trieu

(57) ABSTRACT

A rotary piston engine (20) is shown that includes a housing (22) having a toroidal working chamber with inlet (56) and exhaust (54) ports. First and second piston assemblies (30 and 32), each of which includes at least one pair of diametrically opposed pistons (30A and 30B, and 32A and 32B), are located in the working chamber.

Piston assemblies (30 and 32) are connected to the engine output shaft through a differential (78) and the Sakita gear sets (74 and 76), each of which gear sets includes a Sakita type 1 gear (74A or 76A) and a Sakita type 2 gear (74B or 76B). The piston assemblies rotate at variable speed, whereby pistons of the slower speed are trailing pistons during portions of the power and intake phases of engine operation. In one embodiment, the Sakita type 1 gear includes teeth in the form of rollers. Also, spark plugs embedded within piston assemblies (30 and 32) are accessible from outside.

5 Claims, 23 Drawing Sheets

U.S. PATENT DOCUMENTS

| | | | | |
|---|---|---|---|---|
| 1,244,642 A | | 5/1917 | Holmes | 418/35 |
| 2,108,385 A | | 2/1938 | Murakami | 418/36 |
| 2,657,676 A | | 11/1953 | Mallnckrodt | 418/35 |
| 2,804,059 A | | 4/1957 | Honjyo | 123/245 |
| 2,957,363 A | * | 10/1960 | Ingham et al. | 74/437 |
| 3,125,892 A | * | 3/1964 | Schwesinger | 74/393 |
| 3,178,959 A | * | 4/1965 | Schwesinger | 74/437 |
| 3,256,866 A | | 6/1966 | Bauer | 123/245 |
| 3,294,071 A | | 12/1966 | Turco | 418/35 |
| 3,327,637 A | * | 6/1967 | Hotta | 74/437 |
| 3,396,632 A | | 8/1968 | LeBlanc | 123/245 |
| 3,398,643 A | | 8/1968 | Schudt | 418/36 |
| 3,420,116 A | * | 1/1969 | Seybold | 74/437 |
| 3,424,021 A | * | 1/1969 | Freudenstein | 74/437 |
| 3,585,874 A | | 6/1971 | Ingham | 74/393 |
| 3,721,131 A | * | 3/1973 | Ingham | 74/393 |
| 3,730,654 A | | 5/1973 | McMahon | 418/35 |
| 3,769,946 A | | 11/1973 | Scherrer | 418/36 |
| 3,990,405 A | | 11/1976 | Kecik | 123/245 |
| 4,003,681 A | | 1/1977 | Wildhaber | 418/36 |
| 4,026,249 A | | 5/1977 | Larrea | 123/245 |
| 4,028,019 A | | 6/1977 | Wildhaber | 418/36 |
| 4,055,091 A | | 10/1977 | Kerr | 74/394 |
| 4,057,374 A | | 11/1977 | Seybold | 123/245 |
| 4,646,694 A | | 3/1987 | Fawcett | 123/245 |
| 4,901,694 A | | 2/1990 | Sakita | 123/234 |
| 5,133,317 A | | 7/1992 | Sakita | 123/234 |
| 5,170,677 A | * | 12/1992 | Yonekura et al. | 74/393 |
| 5,192,201 A | | 3/1993 | Beben | 123/245 |
| 5,251,507 A | * | 10/1993 | Takahara et al. | 74/437 |
| 5,381,766 A | | 1/1995 | Sakita | 123/245 |
| 5,433,179 A | | 7/1995 | Wittry | 123/245 |
| 6,289,867 B1 | | 9/2001 | Free | 123/245 |

* cited by examiner

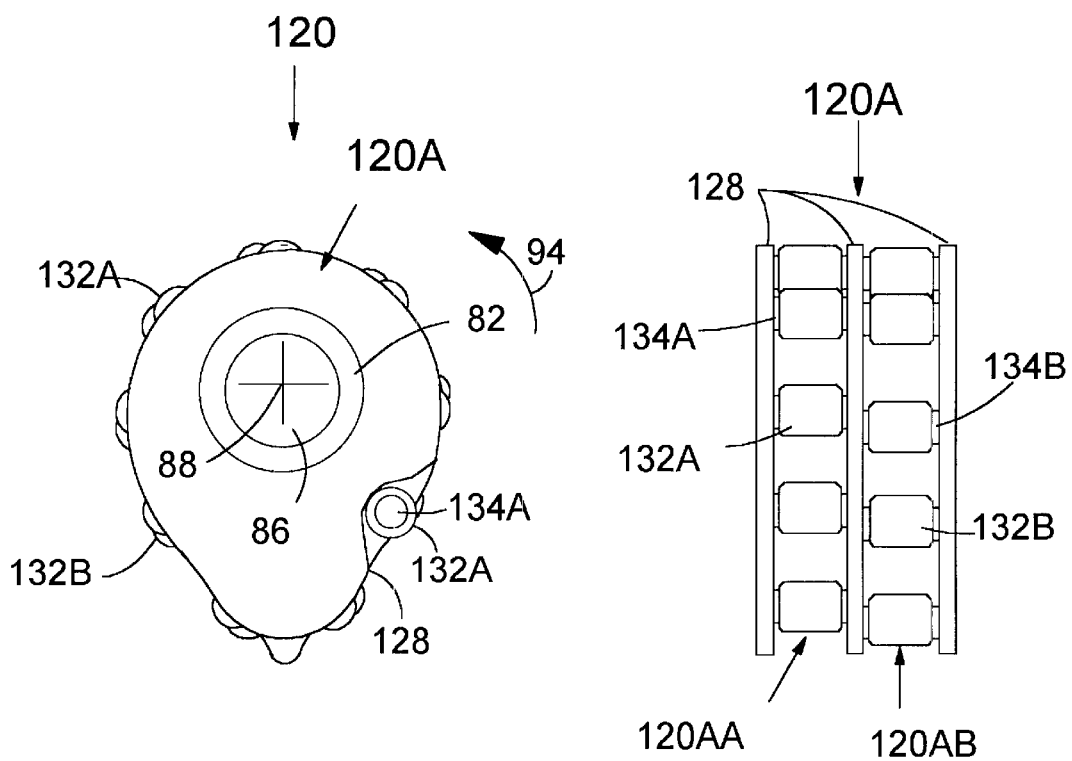
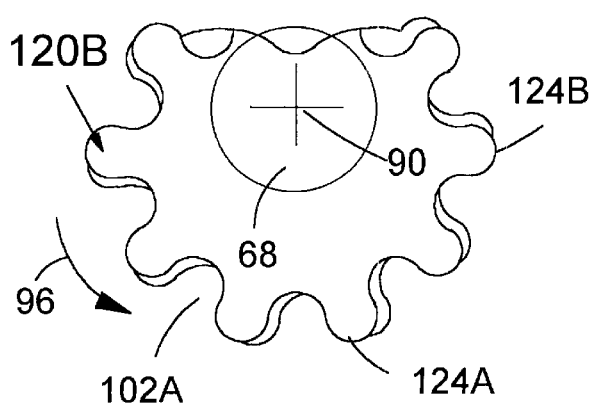
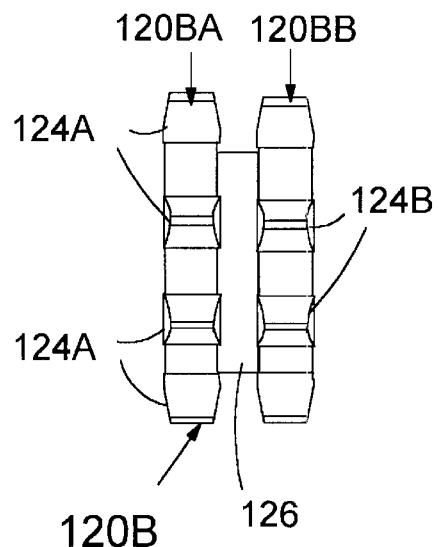
Fig. 17     Fig. 18

Fig. 24A $$\omega_0 = (\omega_1 + \omega_2)/2 \tag{1}$$

$$Y_1 = D/(2 + \alpha) \tag{2}$$

$$Y_2 = D/(2 - \alpha) \tag{3}$$

$$X_1 = D(1 + \alpha)/(2 + \alpha) \tag{4}$$

$$X_2 = D(1 - \alpha)/(2 - \alpha) \tag{5}$$

$$x\omega_0 = (D - x)\omega \tag{6}$$

$$\omega = \omega_0 + (\omega_0 - \omega_{min})\cos(\theta\pi/\theta_1) \tag{7}$$

$$x = D[1 + \alpha\cos(\theta\pi/\theta_1)]/[2 + \alpha\cos(\theta\pi/\theta_1)] \tag{8}$$

$$y = D/[2 + \alpha\cos(\theta\pi/\theta_1)] \tag{9}$$

$$\theta_y = \int_0^\theta [1 + \alpha\cos(\theta\pi/\theta_1)]d\theta \tag{10}$$

FIG. 24B $$\theta_y = \theta + \alpha(\theta_1/\pi)\sin(\theta\pi/\theta_1) \qquad (11)$$

$$\theta_y = (\theta_1/\pi)\cos^{-1}\beta + \alpha(\theta_1/\pi)\sin(\cos^{-1}\beta) \qquad (12)$$

where $\alpha = (\omega_0 - \omega_{min})/\omega_0$ $\beta = (D - 2y)/(\alpha y)$ and $\omega_0$ = W0; $\omega_1$ = W1; $\omega_2$ = W2; $\omega_{min}$ = Wmin;

$\alpha$ = alpha; $\beta$ = beta; $\pi$ = pi;

$Y_1$ = Y1; $Y_2$ = Y2; $X_1$ = X1; $X_2$ = X2;

$\theta$ = Q; $\theta_1$ = $Q_1$; $\theta_y$ = $Q_y$;

and $\cos^{-1}$ = acos in Detailed Description of Specification.

US 6,457,452 B1

MECHANISM FOR INTERCONNECTING FIRST-AND SECOND-SHAFTS OF VARIABLE SPEED ROTATION TO A THIRD SHAFT

RELATED APPLICATION

This is a divisional application of copending application entitled "Rotary Piston Engine" application Ser. No. 09/898,983 filed on Jul. 3, 2001 which claims benefit to U.S. provisional application Serial No. 60/289,240, filed May 7, 2001.

DOMESTIC PRIORITY

This application is entitled to the benefit of provisional application entitled "Rotary Piston Engine" Application No. 60/289,240 filed on May 7, 2001.

FIELD OF THE INVENTION

This invention relates generally to the mechanism for interconnecting first- and second-shafts of variable speed rotation to a third shaft of constant speed rotation.

BACKGROUND OF THE INVENTION

In U.S. Pat. No. 5,405,300 by the present inventor, Sakita, the present inventor described a gear mechanism that enables interconnecting first- and second-shafts of intermittent rotation. The present invention is an extension of the work presented in said patent.

OBJECTS OF THE INVENTION

An object of this invention is the provision of a mechanism for interconnecting first and second shafts of variable speed rotation to third shaft of constant rotation, in which mechanism, the designer is able to specify the rotational speed profiles of the first- and second-shafts.

SUMMARY OF THE INVENTION

The present invention includes differential means having first and second input shafts and an output shaft, together with first and second noncircular gear sets. Each of the first and second gear sets includes two types of intermeshing noncircular gears we call Sakita type 1 and type 2 gears (or type 1 and type 2 gears). The extension of the differential output becomes the output shaft, which is connected through a circular gear set to an idler shaft to which type 2 gears are affixed. The type 1 gears of the first and second gear sets are connected to the first and second differential input shafts, respectively. The type 1 gears rotate with widely varying speeds, while the type 2 gears rotate at the same rate as the output shaft of the engine. The differential assures that the sum of the rotational speed of the type 1 gears equals twice the rotational speed of the type 2 gears.

BRIEF DESCRIPTION OF THE DRAWINGS

The above and other objects and advantages of the invention will be better understood from the following description when considered with the accompanying drawings. It here will be understood that the drawings are for purposes of illustration only and not by way of limitation of the invention. In the drawings, like reference characters refer to the same parts in the several views:

FIG. 17 is a diagram showing the front view of an alternative type 1 and type 2 gear set;

FIG. 18 a diagram showing the side view of said alternative type 1 and type 2 gear set;

FIGS. 24A and 24B show, using mathematical notations and commonly used Greek letters for some variables and constants, Equations (1) through (12) described in this Specification.

DETAILED DESCRIPTION OF THE INVENTION

Engine's Working Chamber

Figure 1:
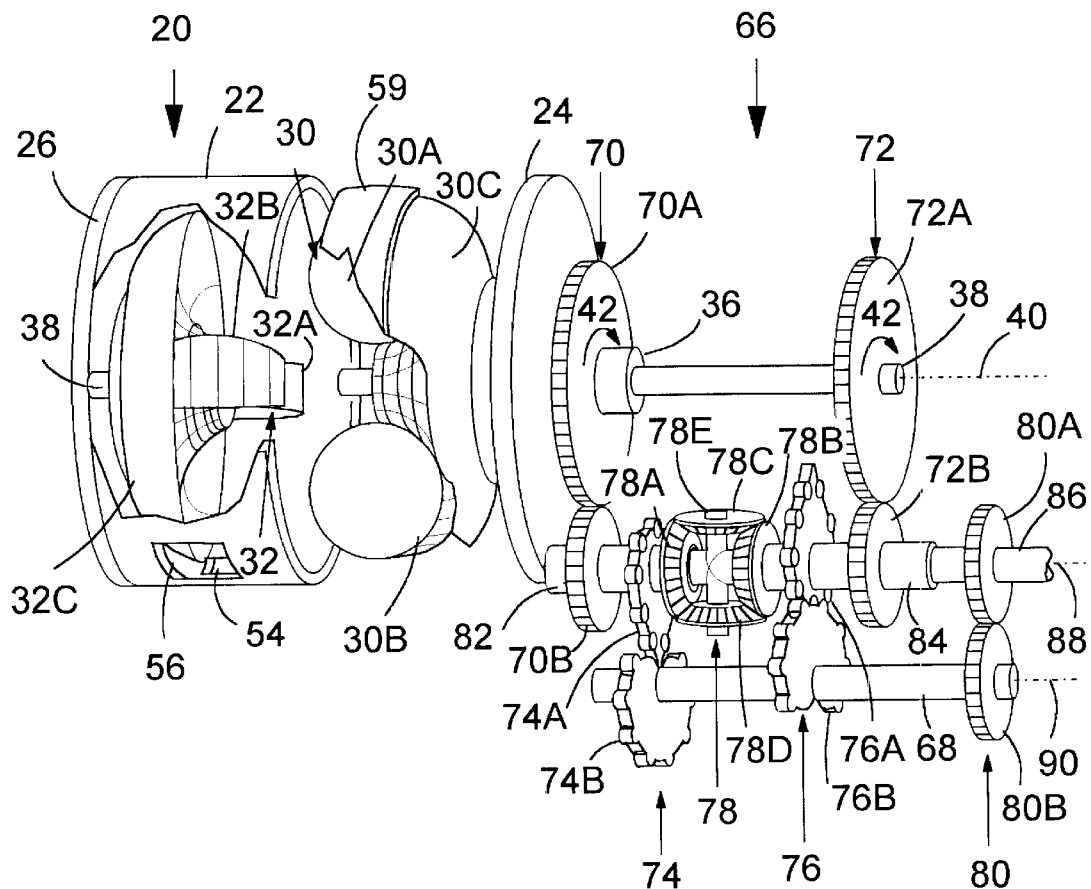
FIG. 1 is an exploded isometric view of a rotary piston engine embodying the present invention.
Figure 2:
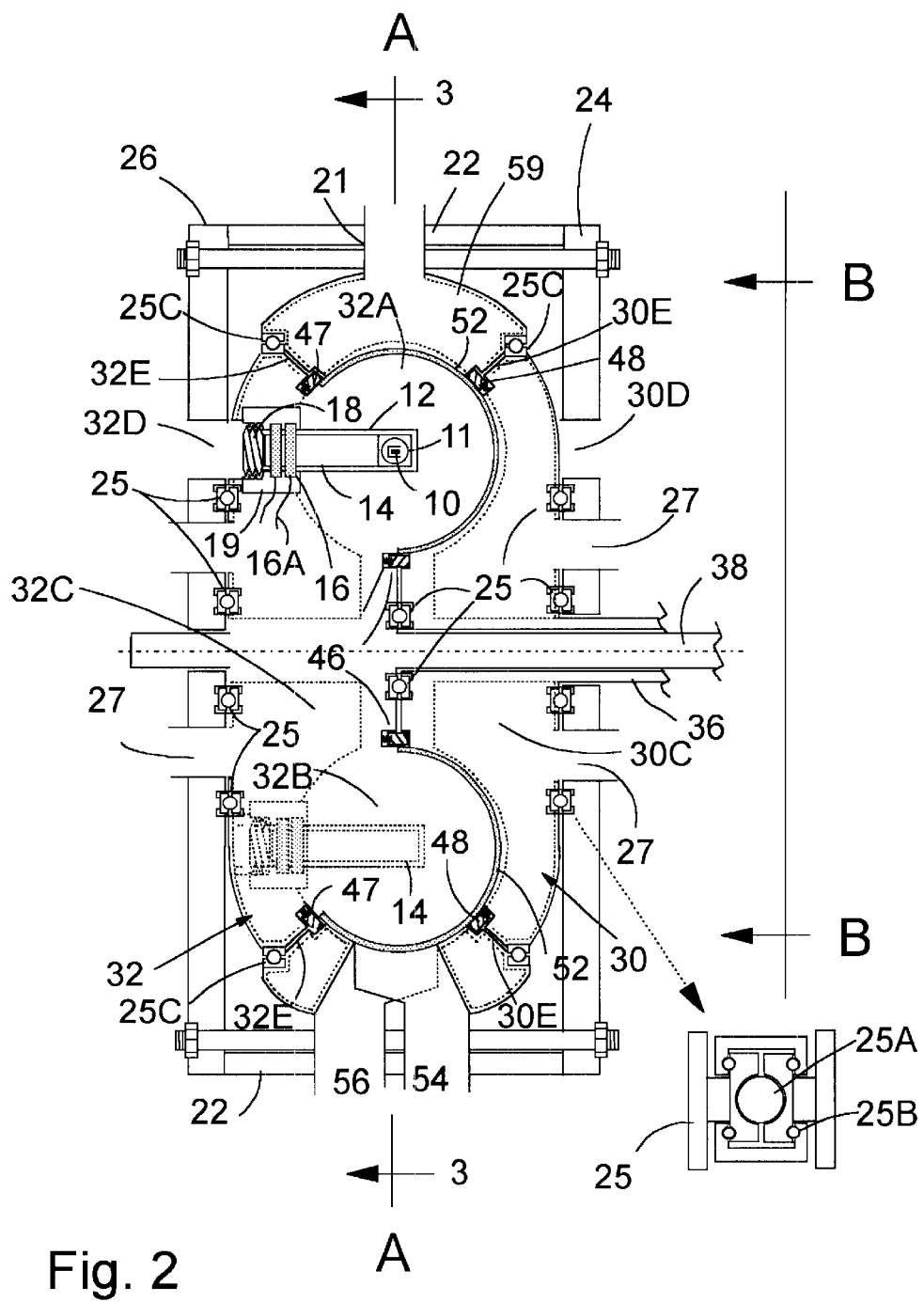
FIG. 2 is a cross-sectional view of the working chamber with a detailed view of the ball bearings.
Figure 3:
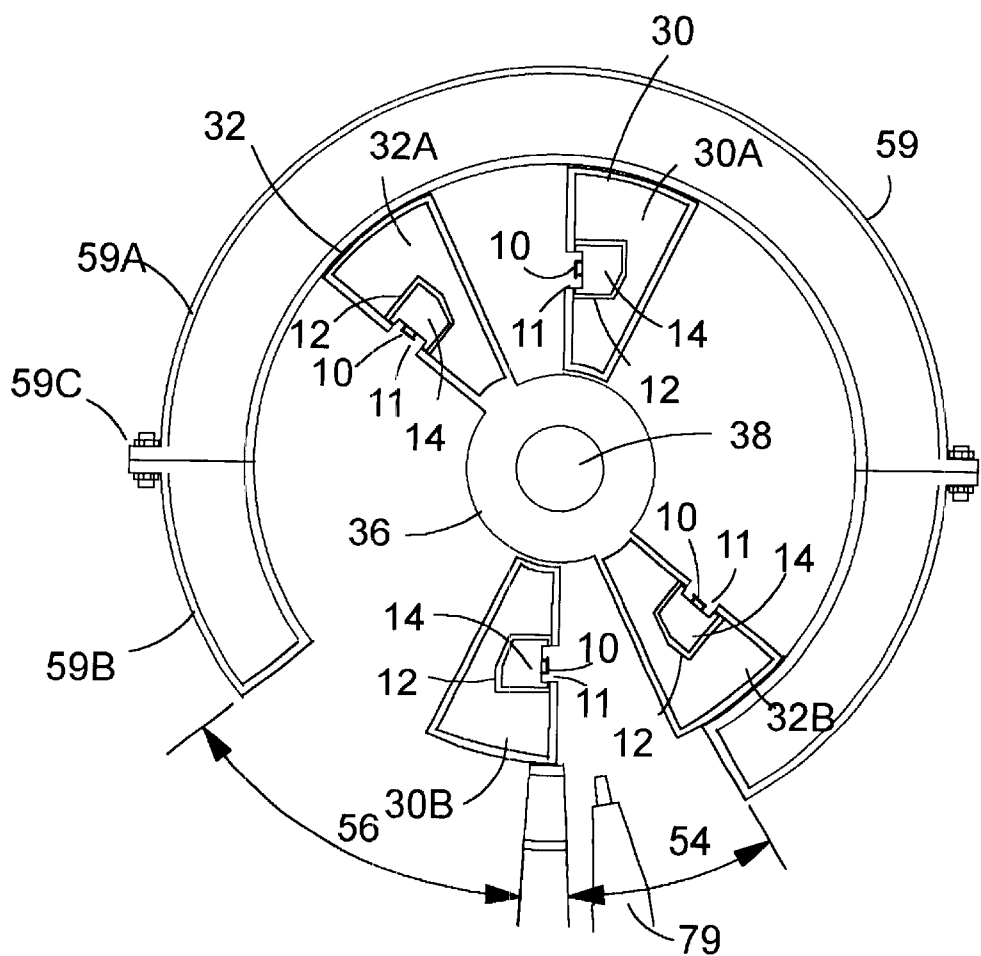
FIG. 3 is an enlarged sectional view taken along line A—A of FIG. 2.
Figure 4:
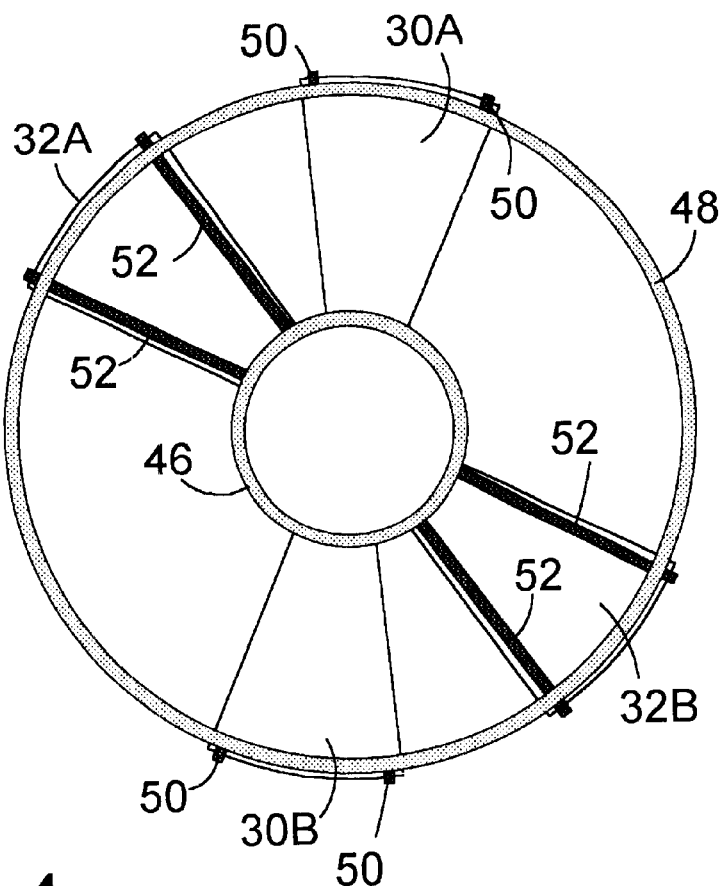
FIG. 4 is a skeletal view of piston assemblies with emphasis on sealing rings, a view taken from B of FIG. 2.
Figure 5:
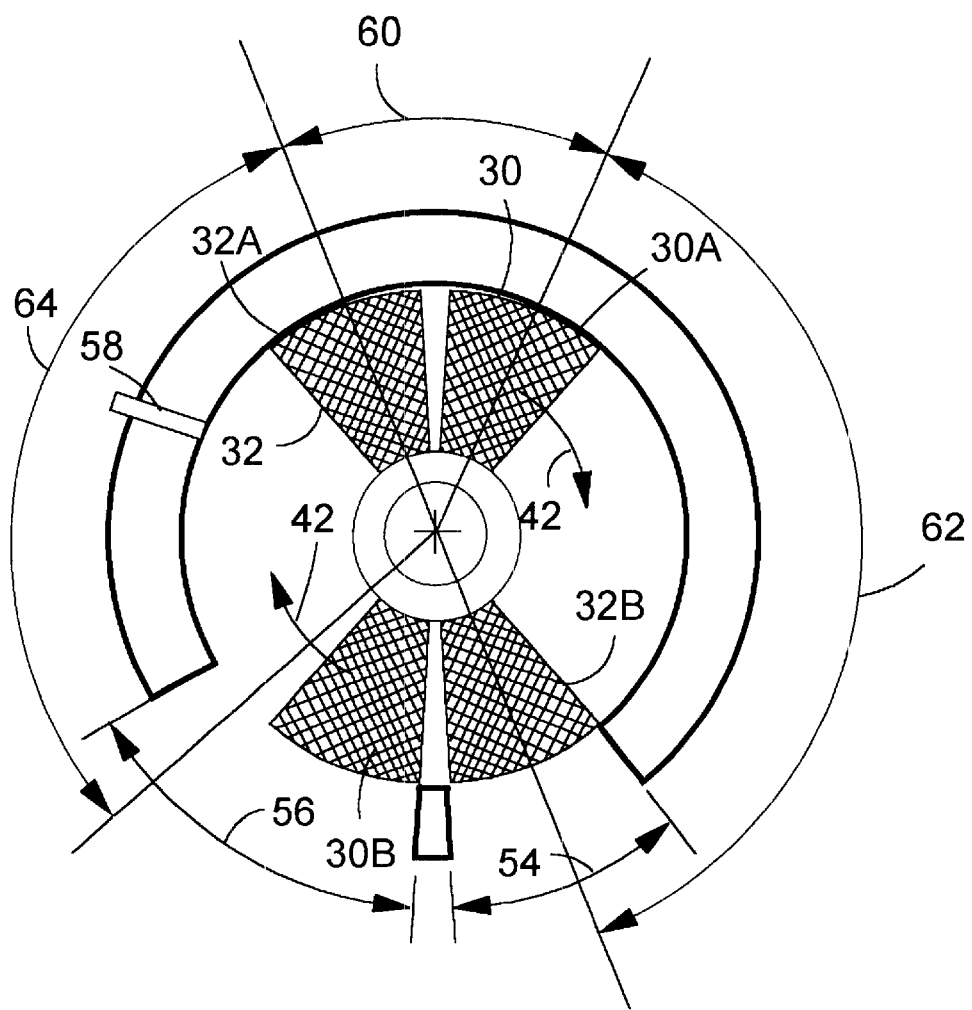
FIG. 5 is a schematic illustration showing separation of functions within the working chamber of a four-piston engine.
Figure 6:
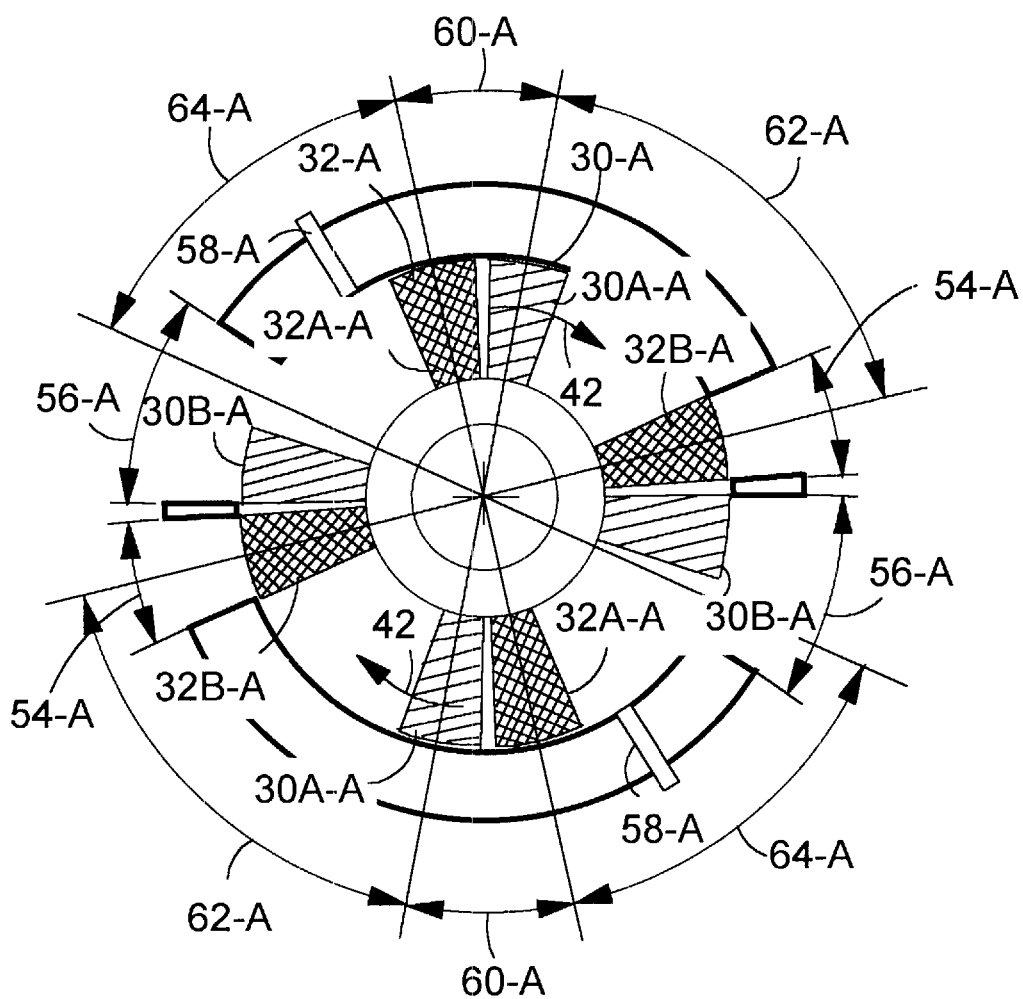
FIG. 6 is a schematic illustration showing separation of functions within the working chamber of an eight-piston engine.

Reference now is made to FIG. 1 of the drawings wherein an engine 20 is shown to include a stationary cylindrical housing 22 having a bore that is closed at opposite ends by engine's housing walls 24 and 26 attached thereto as by bolts or other suitable means, not shown, containing a toroidal working chamber inside. The engine's working chamber formed by piston assemblies 30, 32 and stationary outer cover 59, is divided into first and second pairs of diametrically opposed subchambers by pistons included in first and second piston assemblies 30 and 32. The piston assemblies 30 and 32 are rotatable about a common axis 40 and, in operation, rotate in the same direction as indicated by arrows 42. Piston assembly 30 includes a pair of diametrically opposed pistons 30A and 30B attached to piston hub 30C, and piston assembly 32 includes a pair of diametrically opposed pistons 32A and 32B attached to piston hub 32C. Pistons 30A and 30B are affixed to the outer piston shaft 36 through piston hub 30C. The inner piston shaft 38 is rotatably mounted in the tubular shaft 36. Pistons 32A and 32B of second piston assembly 32 are attached to inner piston shaft 38 through piston hub 32C at diametrically opposed positions. The working chamber is divided into two pairs of diametrically opposed subchambers by four pistons 30A, 30B, 32A, and 32B in a four-piston engine as shown in FIG. 1. Each piston assembly alternately rotates with a faster and slower speed such that trailing pistons rotate at a slower speed than leading pistons during the power and intake phases of engine operation, and periodically variable volume subchambers are provided between adjacent pistons. The engine housing 22 has an opening for an exhaust port 54, and an opening for an intake port 56. Engine's working chamber is also shown in FIGS. 2 and 3 of the drawings.

Connecting Means—66

In the embodiment of the invention illustrated in FIG. 1, connecting means 66 includes circular gear sets 70 and 72, noncircular gear sets 74 and 76, differential means 78, and circular gear set 80. Suffixes A and B are used to identify the separate gears of the gear pairs. Gear 70A of gear set 70 is connected to piston assembly 30 through outer piston shaft 36, and gear 72A of gear set 72 is connected to the other piston assembly 32 through inner piston shaft 38. For the illustrated four-piston engine, circular gear pairs 70 and 72 are provided with a 1:2 gear ratio whereby gears 70B and 72B undergo two complete revolutions for each complete revolution of piston shafts 36 and 38, respectively. In an eight-piston engine, the gear ratio of gear pairs 70 and 72 is 1:4, whereby gears 70B and 72B undergo four complete revolutions for each complete revolution of piston shafts 36 and 38, respectively. The rest of the gear and shaft arrangement in connecting means 66 for an eight-piston engine is identical to that of a four-piston engine.

Circular gears 70B and 72B are affixed to tubular shafts 82 and 84, respectively, which are rotatably mounted on spider shaft 86 of differential 78. Spider shaft 86, which for purposes of description also is defined as the differential output, is supported by suitable bearings, not shown, for rotation about axis 88, which extends parallel to piston shaft axis 40. Spider shaft 86 is also the engine output shaft, which is connected through a circular gear set 80 to an idler shaft 68 to which gears 74B and 76B are affixed. Affixed to tubular shaft 82 are gear 74A of noncircular gear set 74 and end gear 78A of differential 78 for simultaneous rotation thereof with gear 70B. Similarly, tubular shaft 84 has affixed thereto gear 76A of noncircular gear set 76 and end gear 78B of differential 78 for simultaneous rotation thereof with gear 72B. For purposes of description, shafts 82 and 84 to which differential end gears 78A and 78B are affixed, are defined as differential inputs. Differential 78 may be of any conventional type such as the illustrated bevel gear differential which, in addition to end, or sun, gears 78A and 78B, includes spider, or planet, gears 78C and 78D rotatably mounted on spider cross shaft 78E. Spider gears 78C and 78D mesh with end gears 78A and 78B. It should be apparent that noncircular gear sets 74 and 76 are of the same design. Also, it should be apparent that connecting means that does not include differential 78 and uses shaft 68 as the output shaft is possible.

For easier identification of gear sets and gears used in the present invention, we will call the noncircular gear sets represented by 74 and 76 the Sakita gear set, gears represented by 74A and 76A the Sakita type 1 gear (or type 1 gear), and gears represented by 74B and 76B the Sakita type 2 gear (or type 2 gear) wherein the Sakita type 1 and type 2 gear geometries are defined as those which conform to conditions given in Equations (1) through (5) in the following section with no specific definition of gear teeth. It will become apparent that the gear set consisting of teardrop- and heart-shaped gears that enable intermittent rotation of pistons described in U.S. Pat No. 5,381,766 by the present inventor is a special case of the Sakita gear set.

Definition of Type 1 and Type 2 Gear Geometries

The relationship between the rotation of gears 78A and 78B, or differential inputs, and gear 80A, which is connected to the spider shaft 86, or differential output, of differential 78 is expressed as shown in (1) below. All equations presented in this Specification are also shown in FIGS. 24A and 24B of the drawings, using mathematical notations and commonly used Greek letters for some variables and constants.

$$W0 = (W1 + W2)/2 \tag{1}$$

where $W0$=rotational speed of spider shaft 86 and gear 80A, $W1$=rotational speed of sun gear 78A, and $W2$=rotational speed of sun gear 78B.

Because gears 78A and 78B are connected to gears 74A and 76A, respectively, and gear 80B that meshes with 80A at the ratio of 1:1 is connected to gears 74B and 76B, the relationship given in (1) holds for $W0$=rotational speed of gears 74B and 76B, $W1$=rotational speed of gear 74A, and $W2$=rotational speed of gear 76A.

Figure 7:
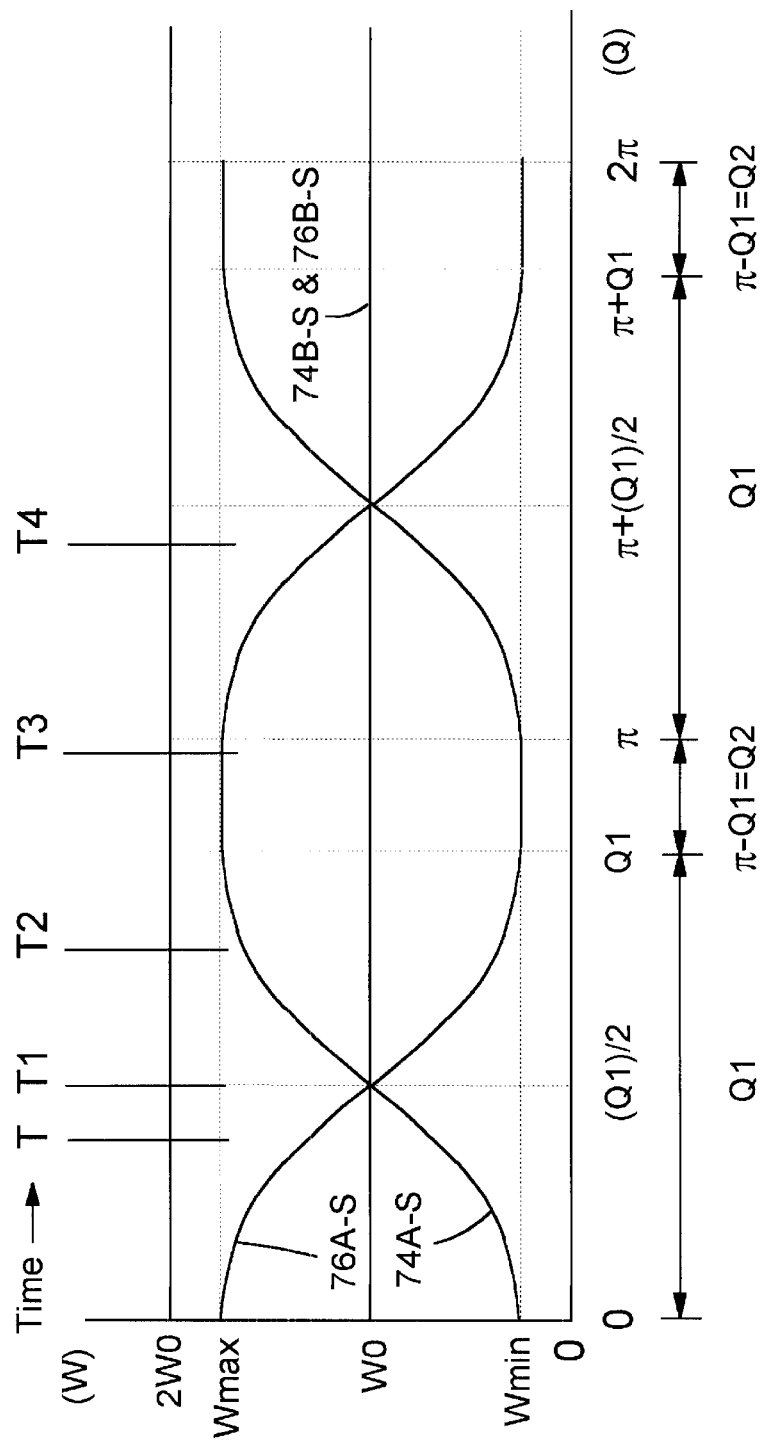
FIG. 7 is a diagram showing the rotational speed profile of type 1 and type 2 gears.
Figure 8:
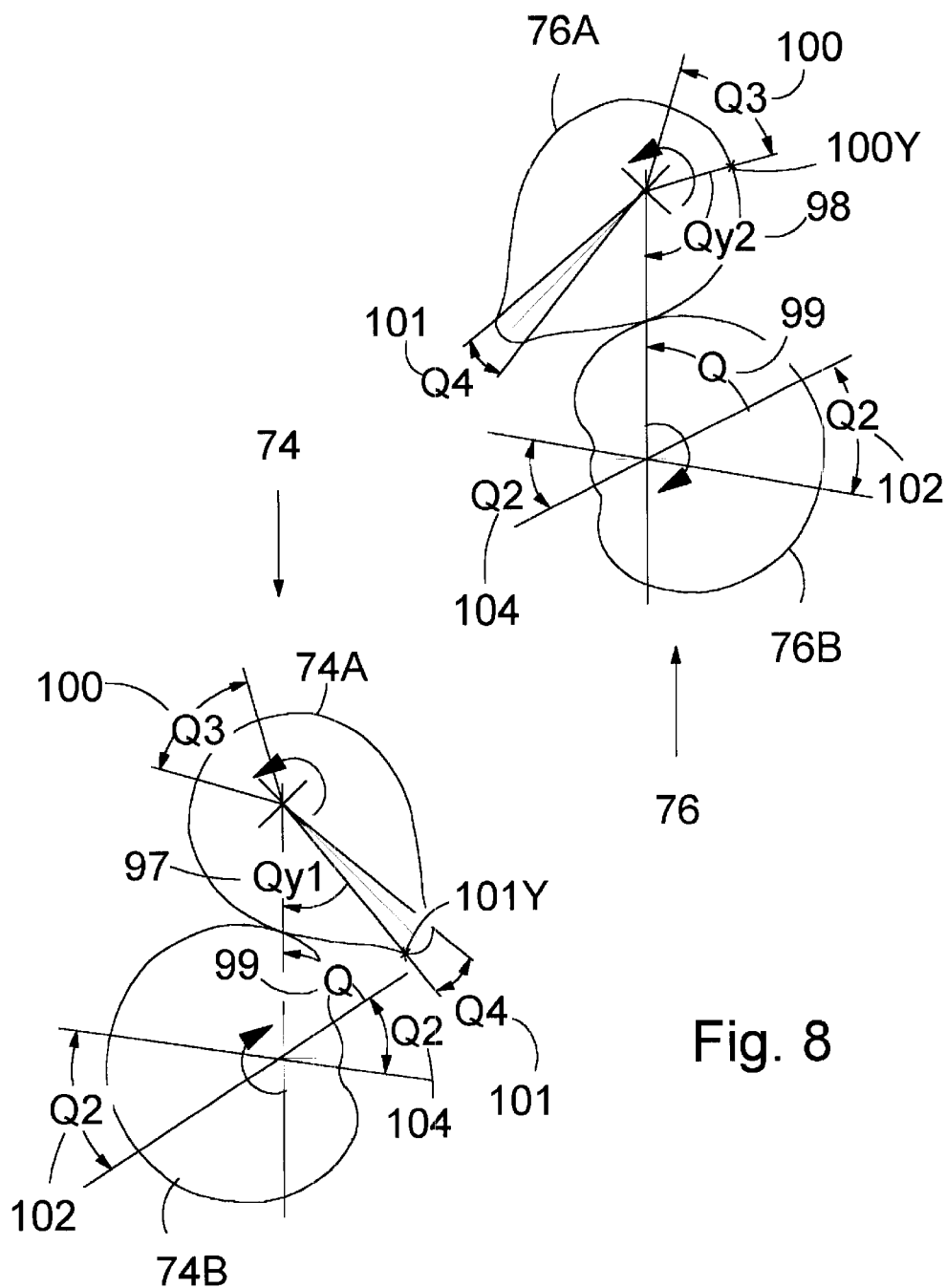
FIG. 8 is a schematic diagram of type 1 and type 2 gears with no gear teeth shown.

Operation of the connecting means 66 will best be understood with reference to FIGS. 7 and 8 of the drawings. The speed profile of type 1 gears, an example of which is schematically given in FIG. 7 of the drawings, shows the way the speed of type 1 gears 74A and 76A vary as they rotate relative to the rotational angle of type 2 gears 74B and 76B, wherein type 2 gears 74B and 76B keep a constant rotational speed $W0$. The horizontal axis (Q) indicates the rotational angle of type 2 gears 74B and 76B in radian, and the vertical axis (W) indicates the rotational speed of type 1 gears 74A and 76A and type 2 gears 74B and 76B. The rotational speed of type 1 gear 74A is represented by 74A-S, that of type 1 gear 76A by 76A-S, that of type 2 gear 74B is represented by 74B-S, and that of type 2 gear 76B by 76B-S. The positions of type 1 and type 2 gears corresponding to the gear operation at time point T in FIG. 7 are given in FIG. 8. At that time, rotational angle of type 2 gears 74B and 76B measured from the end of circular segments 104 and 102, respectively, is Q (99). At Q=0 in FIG. 7, type 1 gear 74A is at 101Y, or the end of circular segment 101 (FIG. 8), ready to increase its rotational speed, and type 1 gear 76A is at 100Y, or the end of circular segment 100 (FIG. 8), ready to decrease its rotational speed. While type 2 gears 74B and 76B each travels Q (99), type 1 gear 74A travels Qy1 (97) and type 1 gear 76A travels Qy2 (98) as shown in FIG. 8. In FIG. 7, the rotational speed of type 1 and type 2 gears 74A and 76A and type 2 gears 74B and 76B all becomes equal at Q=(Q1)/2 and later again at Q=pi+(Q1)/2, where pi signifies Greek letter "pi' denoting the ratio of the circumference of a circle to its diameter. Type 1 gear 74A is in a nonactive phase of operation between Q=0 and Q=(Q1)/2, in an active phase between Q=(Q1)/2 and Q=pi+(Q1)/2, and in a non-active phase between Q=pi+(Q1)/2 and 2pi. Type 1 gear 76A is in an active phase of operation between Q=0 and Q=(Q1)/2, in a nonactive phase between Q=(Q1)/2 and Q=pi+(Q1)/2, and in an active phase between Q=pi+(Q1)/2 , and 2pi. Type 1 gear 74A rotates at maximum speed, Wmax, and type 1 gear 76A rotates at minimum rotational speed, Wmin, between Q1 and pi, during which time gear set 74 meshes at the circular segments 100 and 102 of gears 74A and 74B, respectively, while gear set 76 meshes at the circular segments 101 and 104 of gears 76A and 76B, respectively. Type 1 gear 74A rotates at minimum rotational speed, Wmin, and type 1 gear 76A rotates at maximum rotational speed, Wmax, between pi+Q1 and 2pi, during which time gear set 74 meshes at the circular segments 101 and 104 of gear 74A and 74B, respectively, while gear set 76 meshes at the circular segments 100 and 102 of gears 76A and 76B, respectively. The rotational angle of type 1 gear 74A while type 2 gear 74B rotates from Q1 to pi is Q3, and the rotational angle of type 1 gear 76A while type 2 gear 76B rotates from Q1 to pi, is Q4. The rotational angle of the type 2 gear in the same duration is Q2=pi-Q1. If neither type 1 nor type 2 gears have circular segments, then, Q1=pi, and Q2=Q3=Q4=0. Note that from Equation (1) above, Wmax=2W0-Wmin.

Figure 9:
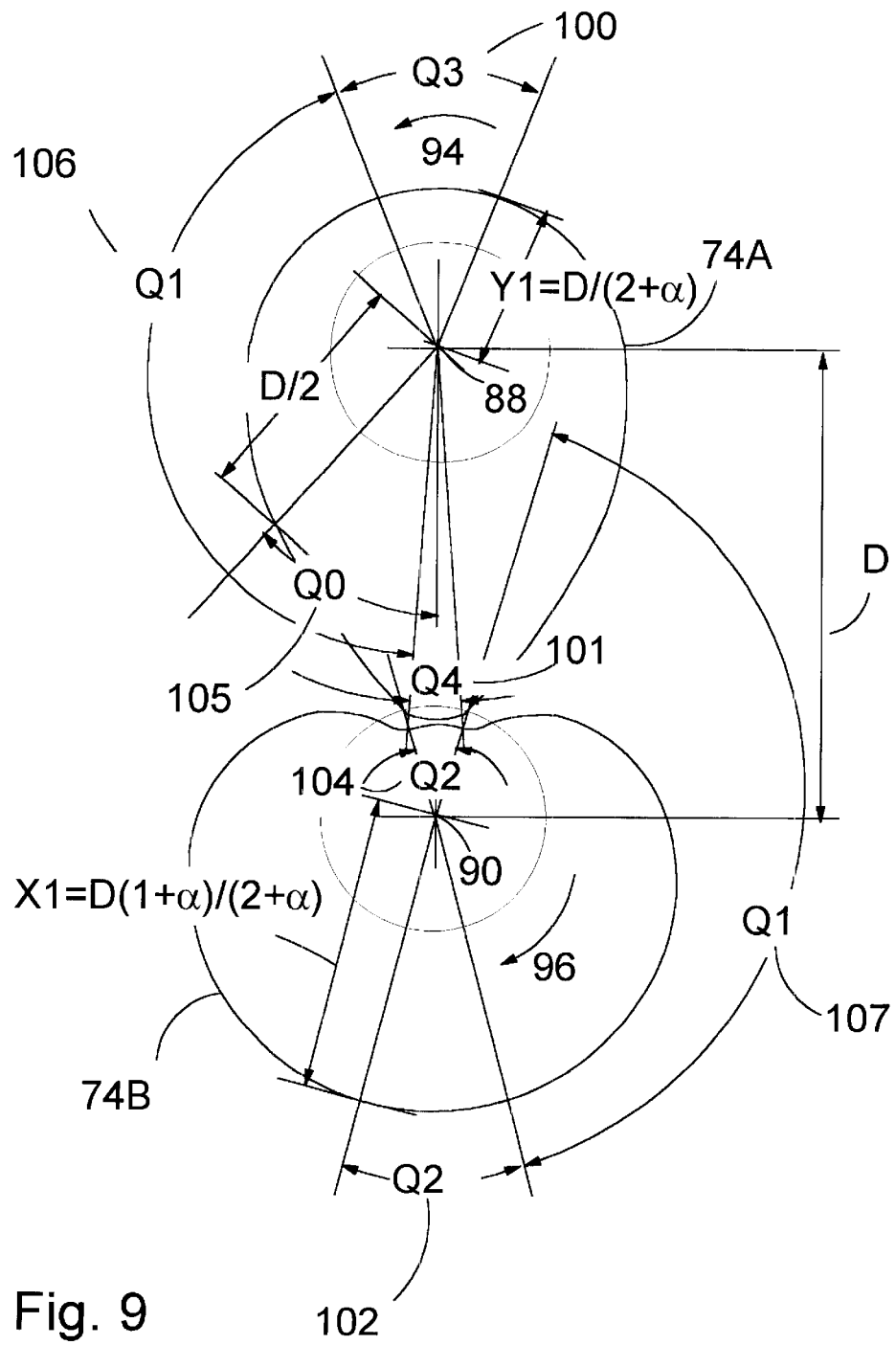
FIG. 9 is a diagram of geometries of the type 1 and type 2 gears with no gear teeth shown.
Figure 10:
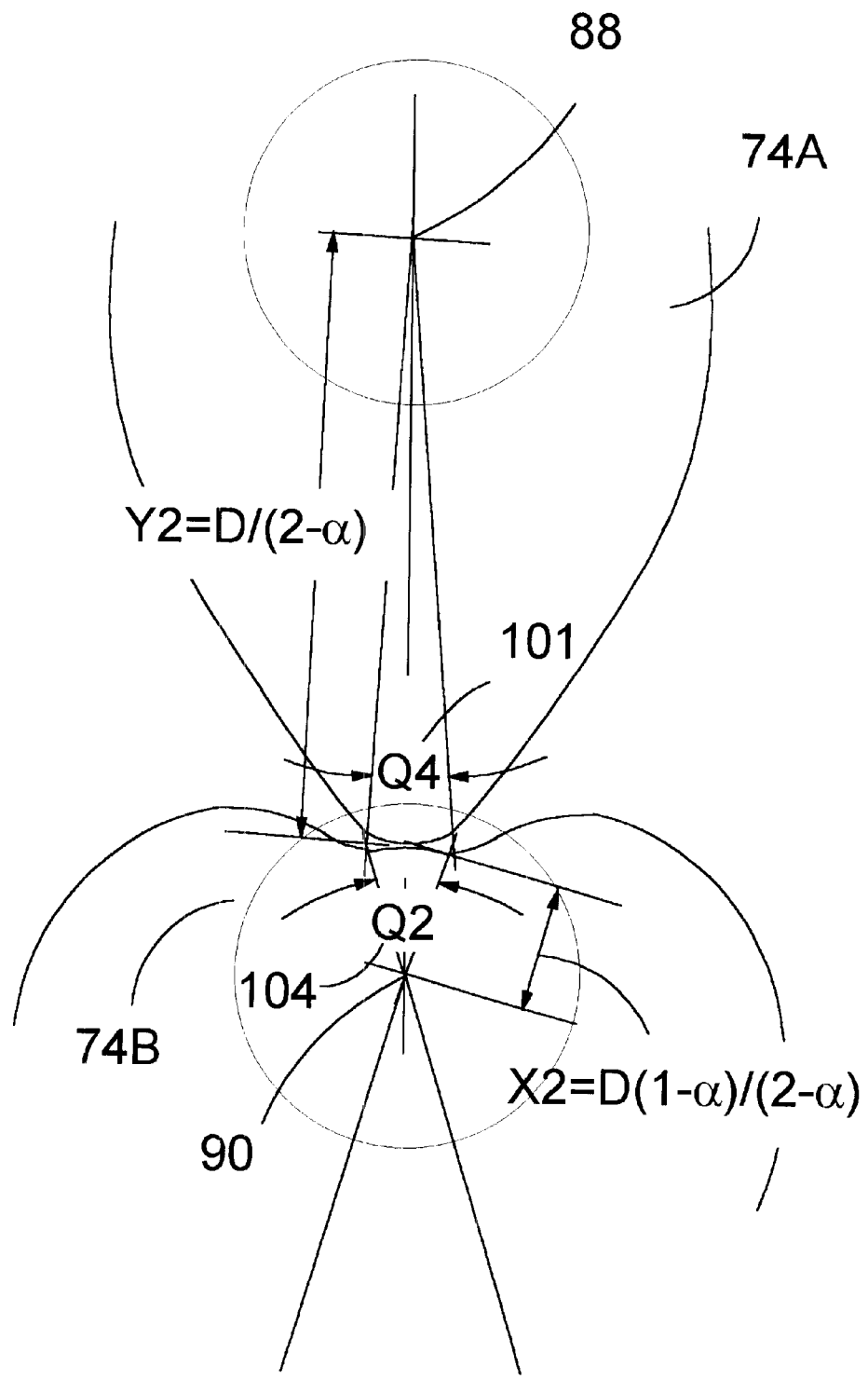
FIG. 10 is a detailed view of gear geometries near the rotational axis of the type 2 gear.

Reference now is made to FIG. 9 of the drawings wherein geometries of the noncircular gear set 74 with no gear teeth (or gear bodies of gear set 74) are depicted in detail. FIG. 10 shows details of the gear geometries in the vicinity of the rotational axis 90 of the type 2 gear 74B. Noncircular gear sets 74 and 76 are of the same design so that a detailed description of only one is required. In FIG. 9, gear set 74 is shown in the position illustrated in FIG. 1, which is 180 degrees out of phase with gear set 76. As will become apparent hereinbelow, the degree to which gear sets 74 and 76 are rotationally out of phase varies continuously during engine operation. As viewed in FIG. 9, gears 74A and 74B rotate in the direction of arrows 94 and 96, respectively.

The geometries of type 1 and type 2 gears 74A and 74B are determined by the maximum and minimum rotational speeds of type 1 gear 74A relative to the rotational speed of type 2 gear 74B, the angle traveled by type 2 gear 74B while type 1 gear 74A is traveling at these extreme rotational speeds, and the speed profile of type 1 gear relative to the rotational speed of type 2 gear 74B between the two extreme rotational speeds.

Let

Y1=radius of circular arc segment 100 of type 1 gear 74A in which the type 1 gear operates at maximum speed (FIG. 9), Y2=radius of circular arc segment 101 of type 1 gear 74A in which the type 1 gear operates at minimum speed (FIG. 10), X1=radius of circular arc segment 102 of type 2 gear 74B in which it meshes with the type 1 gear operating at maximum speed (FIG. 9), X2=radius of circular arc segment 104 of type 2 gear 74B in which it meshes with the type 1 gear operating at a minimum speed (FIG. 10), and D=distance between the centers of the rotational axes of the type 1 and type 2 gears (FIG. 9).

Then, X1+Y1=D, and X2+Y2=D. If we set alpha=(W0-Wmin)/W0, then, Y1, Y2, X1, and X2 are expressed in D and alpha as:

$$Y1 = D/(2+\text{alpha}), \qquad (2)$$

$$Y2 = D/(2-\text{alpha}), \qquad (3)$$

$$X1 = D(1+\text{alpha})/(2+\text{alpha}), \qquad (4)$$

and $$X2 = D(1-\text{alpha})/(2-\text{alpha}), \qquad (5)$$

where alpha signifies Greek letter "alpha." In the noncircular curve segments of the type 1 gear, the distance between the rotational center and the point of contact with the type 2 gear varies from Y1 to Y2, and Y2 to Y1; and in the nocircular curve segments of the type 2 gear, the distance between the rotational center and the point of contact with the type 1 gear varies from X1 to X2 and X2 to X1, Y1, Y2, X1, and X2 defined in Equations (2) through (5) hold for all speed profiles.

In (2) through (5), "alpha" can take any value between 0 and 1. If alpha=1, the gears will become "perfect" heart- and teardrop-shaped gears, wherein Y1=D/3, Y2=D, X1=2D/3, and X2=0. If alpha=0, the gears become circular gears with equal radii, wherein Y1=Y2=X1=X2=D/2.

Y1 and X1 given in (2) and (4), respectively, are shown in FIG. 9, and Y2 and X2 given in (3) and (5), respectively, are shown in FIG. 10. In FIG. 9, Q0 (105) is the angle created by the type 1 gear's apex, the rotational center of the gear, and its point of contact with the type 2 gear; and at which point the speeds of the type 1 and type 2 gears all become equal; Q0 also is half the angle the type 1 gear travels (in the four piston engine) in the nonactive phase. We call angle Q0 the equi-speed angle. Q1 is the rotational angle of the noncircular segment 106 of the type 1 gear, and it is also the rotational angle of the noncircular segment 107 of the type 2 gear; Q2 is the rotational angle of each of circular segments 102 and 104 of the type 2 gear; Q3 is the rotational angle of the circular segment 100 of the type 1 gear; and Q4 is the rotational angle of the circular segment 101 of the type 1 gear. Here, Q3+Q4=2(Q2), and Q1+Q2=pi.

In the four-piston design, Q0 equals the angle of rotation of the trailing piston in the nonactive phase, and it also equals the sum of the thickness of a piston and the gap created by the two pistons when they are closest to each other; half of Q3 equals the rotational angle of the piston at maximum speed, and half of Q4 equals the rotational angle of the piston at minimum speed.

Type 1 and Type 2 Gear Geometries for a Special Case

With reference to FIG. 7 of the drawings, the geometries of type 1 and type 2 gears for a special case in which the type 1 gear follows a rotational speed profile that has sinusoidal curve segments and constant segments, and the type 2 gear operates at a constant speed are described below.

We define:

y=Varying radius of the type 1 gear—distance between the rotation center and the point of contact with the type 2 gear (not shown), x=Varying radius of the type 2 gear—distance between the rotation center and the point of contact with the type 1 gear (not shown), W0=Rotational speed of the type 2 gear (76B-S in FIG. 7), W=Rotational speed of the type 1 gear (76A-S in FIG. 7), Q=Rotational angle of the type 2 gear measured from the end of the circular segment with larger radius of the type 2 gear (variable on horizontal axis in FIG. 7, and 99 in FIG.8), Q1=Total rotational angle of the type 2 gear in the noncircular segment and also the total rotational angle of the type 1 gear in the noncircular segment (FIG. 7), and Qy=Rotational angle of the type 1 gear measured from the end of the circular segment with smaller radius of the type 1 gear (98 in FIG. 8).

Between the rotational speed of the type 2 gear, W0, and the rotational speed of the type 1 gear, W, there exists a relationship such that:

$$xW0=(D-x)W, \quad (6)$$

In Equation (6), D is the distance between the rotational centers of the type 1 and 2 gears.

The rotational speed of the type 1 gear 76A in the noncircular segment that starts at the end of the circular segment with smaller radius (end of rotational speed Wmax) and ends at the beginning of the lareger radius (start of rotational speed Wmin) is expressed as:

$$W=W0+(W0-W\text{min})\cos[Q(\text{pi})/Q1]. \quad (7)$$

Equation (7) reads W equals W0 plus (W0−Wmin) multiplied by cosine [Q multiplied by (pi) divided by Q1].

As we did previously, if we set alpha=(W0−Wmin)/W0, then from Equations (6) and (7), we have $$x=D\{1+(\text{alpha})\cos[Q(\text{pi})Q1]\}/\{2+[(\text{alpha})\cos[Q(\text{pi})/Q1]\} \quad (8)$$

and $$y=D-x=D/\{2+(\text{alpha})\cos[Q(\text{pi})/Q1]\}. \quad (9)$$

From Equation (7) and W=dQy/dt and W0=dQ/dt, we obtain:

$$Qy=S(0, Q)\{1+(\text{alpha})\cos[Q(\text{pi})/Q1]\}dQ \quad (10)$$

where S in S(0, Q) signifies the integral symbol and (0, Q) the range of integration being 0 to Q. Equation (10) is rewritten as:

$$Qy=Q+(\text{alpha})[Q1/(\text{pi})]\sin[Q(\text{pi})/Q1]. \quad (11)$$

From Equations (9) and (11), we obtain:

$$Qy=[Q1/(\text{pi})][a\cos(\text{beta})]+(\text{alpha})[Q1/(\text{pi})]\sin[a\cos(\text{beta})] \quad (12)$$

where a cos=arc cosine, and beta=(D−2y)/[(alpha)y].

Thus, the relationship between Q and x for one of the noncircular segments of the Sakita type 2 gear as shown in (8), and relationship between Qy and y for corresponding noncircular segment of the Sakita type 1 gear as shown in (12), have been established. It must be apparent that the relationship shown in (8) holds for the other noncircular segment of the Sakita type 2 gear, and (12) holds for corresponding segment of the type 1 gear except that angles are measured in opposite directions. As mentioned earlier, type 1 and type 2 gears may be formed entirely of noncircular segments. Then, Q1=pi.

Figure 11:
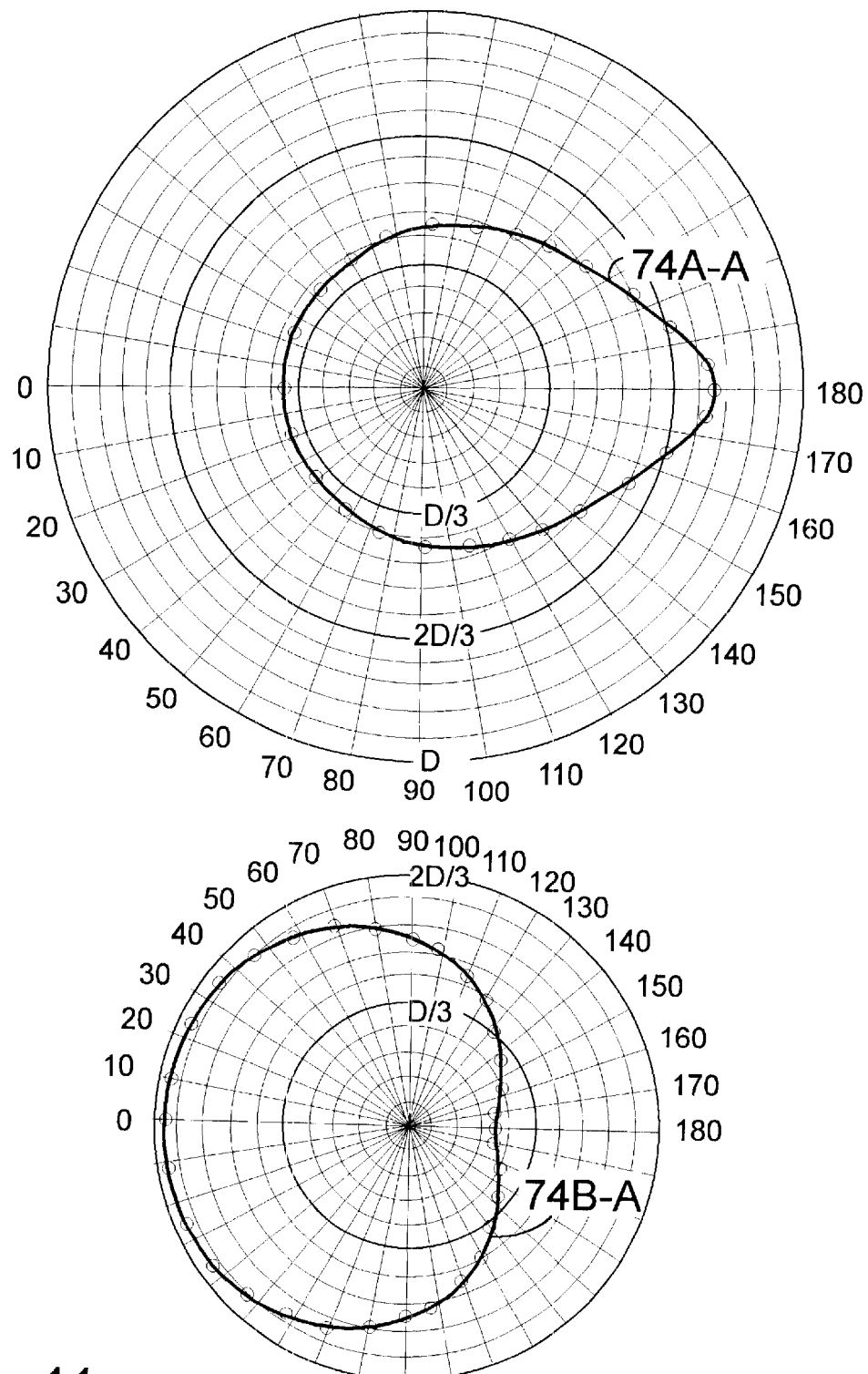
FIG. 11 is a diagram of a type 1 and type 2 gear set for alpha=0.7 with no gear teeth shown.

Reference now is made to FIG. 11 of the drawings wherein sample type 1 and type 2 gear designs 74A-A and 74B-A, respectively, are shown. The type 1 and type 2 gears shown in FIG. 11 are with alpha=0.7 and Q1=pi, in which the speed profile of the type 1 gear follows a sinusoidal curve with no constant speed segments. The type 1 gear 74A has a teardrop-shaped body with a round apex, and the corresponding type 2 gear 74B has a heart-shaped body with a round shallow cusp. In this example, the type 1 gear is formed with two noncircular segments, in each of which the radius (or the distance between the center of rotation to the contact point with the other gear) changes from 0.37D to 0.77D. The type 2 gear is formed with two noncircular arc segments, in each of which the radius (or the distance between the center of rotation to the contact point with the other gear) changes from 0.63D to 0.23D. As the value of alpha or the duration of constant-speed operation changes, the physical geometries of the type 1 and type 2 gears also change. Type 1 and type 2 gears with alpha=1.0 are perfect teardrop and heart shaped, with a sharp apex in the type 1 gear and a sharply cut cusp in the type 2 gear. As the value of alpha decreases, the apex of the type 1 gear loses sharpness, as does the concave segment of the type 2 gear, so they are no longer teardrop shaped or heart shaped at alpha values less than 0.6. Finally at alpha=0, type 1 and type 2 gears become circles with the same radius of 0.5D.

The type 1 and type 2 gears of both gear sets operate perfectly well under any speed variation of the type 2 gear, because rotational speeds of the type 1 gears has been defined relative to rotational speed of the type 2 gears, and thus, any increase/decrease in rotational speed of the type 2 gears will incur proportionately higher/lower rotational speed of the type 1 gears, and any increase/decrease in rotational angle traveled by the type 2 gears due to the rotational speed change within a given time period will incur proportionately higher/lower rotational angle traveled by the type 1 gears in the same time period.

Form Equation (1) and above discussion, it will be clear that if one gear set is meshing there is no requirement that the other gear set be meshing at the same time.

Construction of Type 1 and—Type 2 Gears

Figure 12:
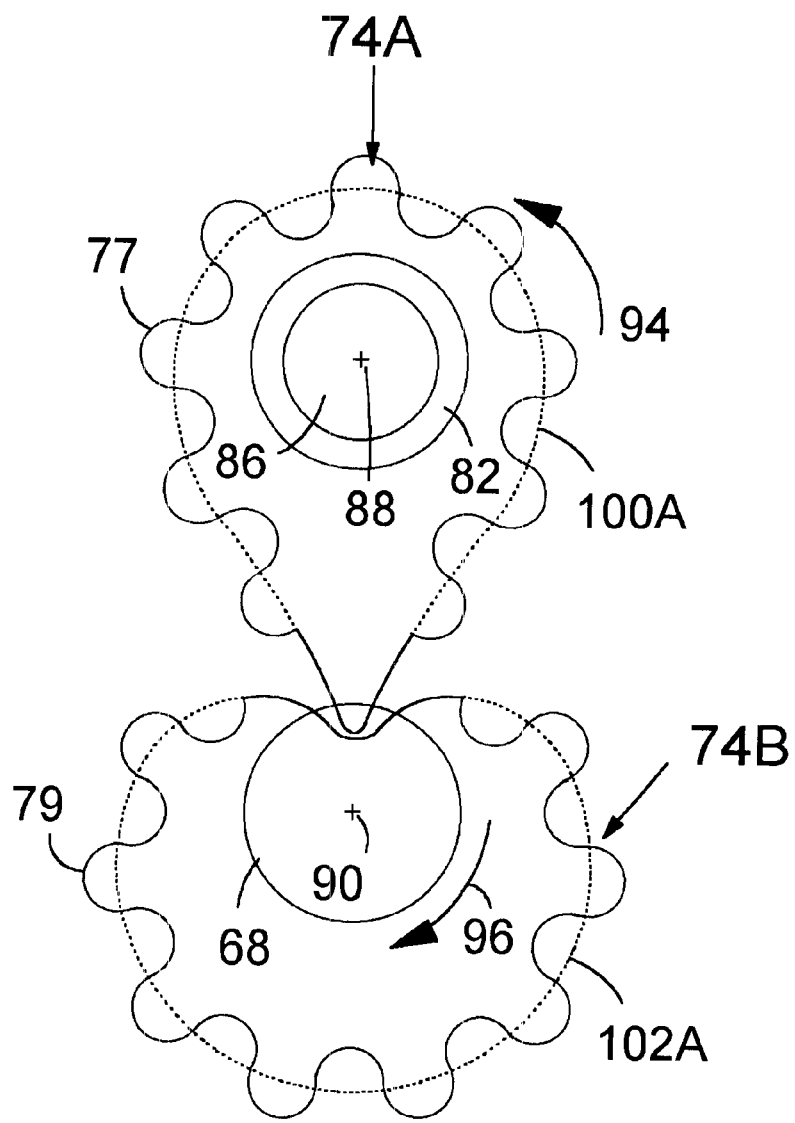
FIG. 12 is a diagram showing a type 1 and type 2 gear set.

Reference now is made to FIG. 12, wherein a gear set 74 comprising a type 1 gear 74A and a corresponding type 2 gear 74B is shown with outwardly extending round-shaped gear teeth 77 and 79 about the peripheries thereof. The type 1 gear 74A is shown affixed to tubular shaft 82 which, in turn, is rotatably supported on shaft 86 rotatable about shaft axis 88. Similarly, heart-shaped gear 74B is shown attached to shaft 68 rotatable about axis 90. The dotted line 100A of the type 1 gear 74A and dotted line 102A of the type 2 gear 74B, identified as pitch lines, and also the peripheries of gear bodies, represent the theoretical geometries of the type 1 and type 2 gears (i.e., gears without their gear teeth). Pitch line is a line that connects gear teeth's points of contact under special circumstance, in which the contact point is on the line that connects the rotational centers of the two gears.

The type 1 and type 2 gears contact each other at the sides of the gear teeth in segments where gear teeth are placed and at the body of the gears represented by the pitch lines near the apex of the type 1 gear and at the concave segment of the type 2 gear.

Figure 13:
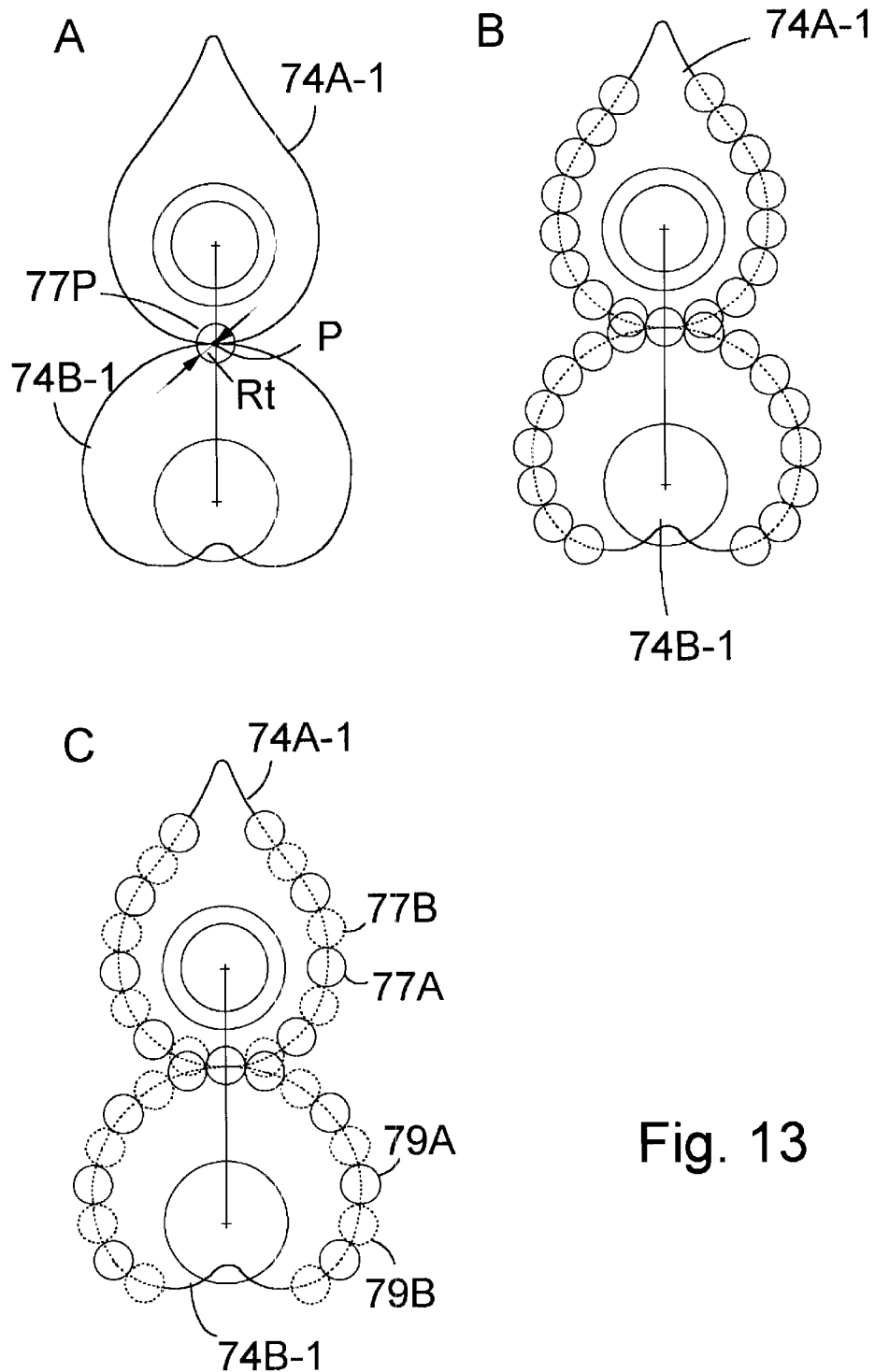
FIG. 13 is a diagram showing the process of arranging gear teeth of type 1 and type 2 gears.
Figure 14:
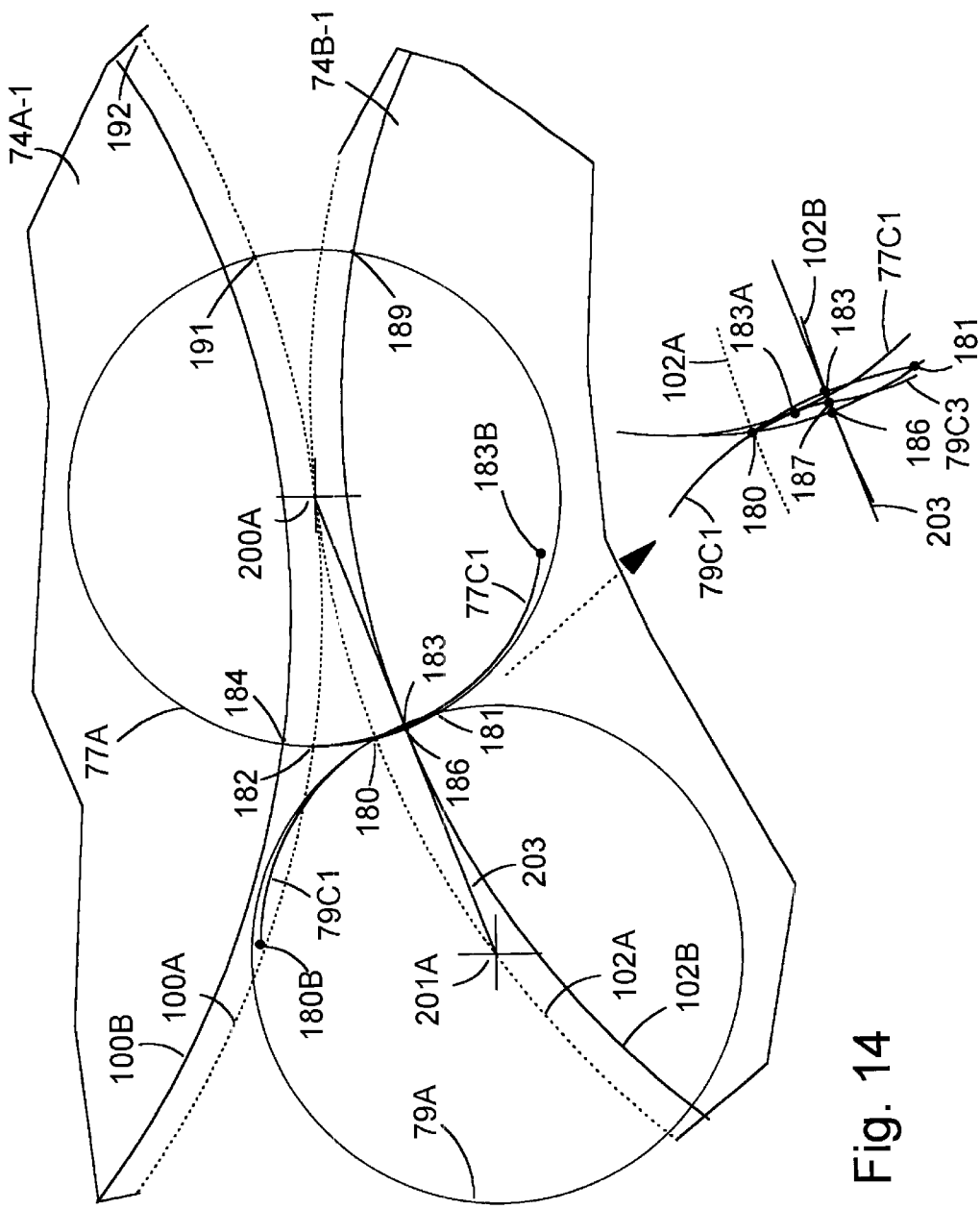
FIG. 14 is an enlarged view of curves involved in the type 1 and type 2 gears' teeth, with a detailed view of a selected area.
Figure 15:
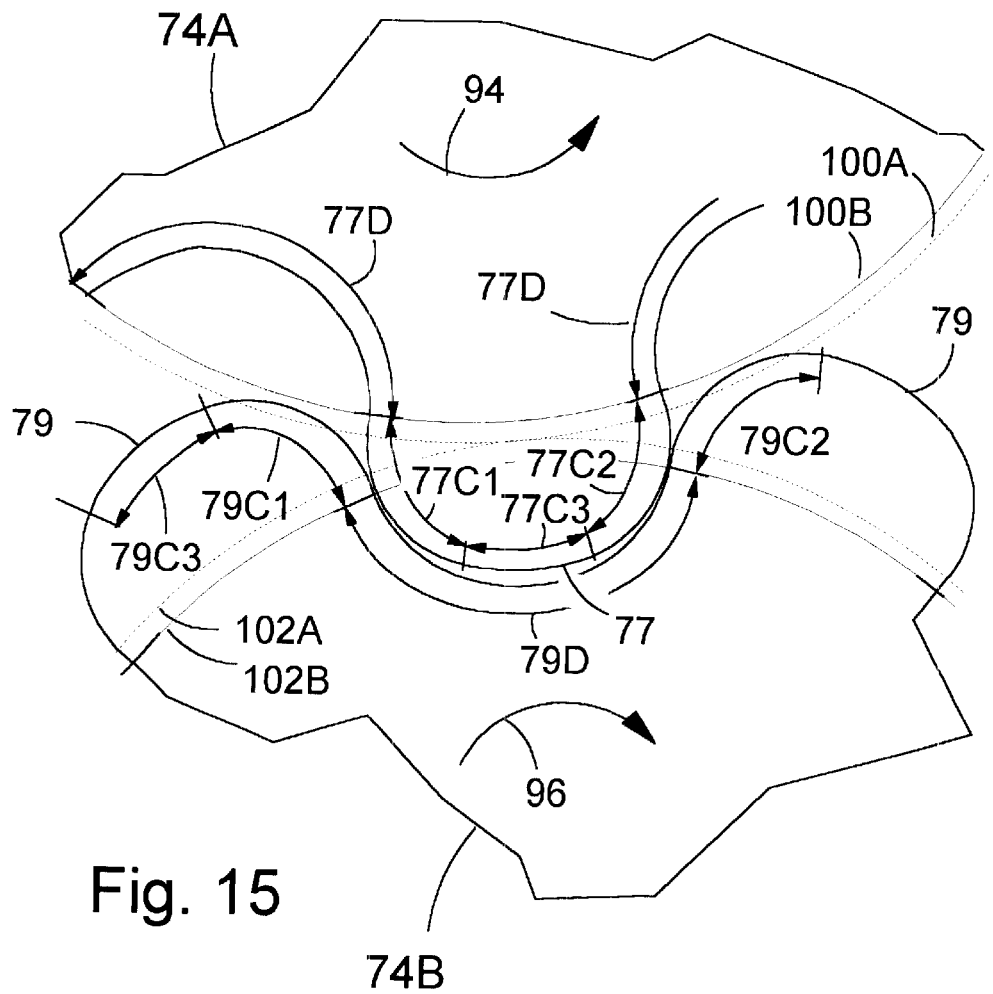
FIG. 15 is an enlarged view showing the meshing of type 1 and type 2 gears.

The gear design may be best understood by describing the step-by-step process involved in arranging the gear teeth of the type 1 and type 2 gears with reference to FIGS. 13 through 15 of the drawings. First, reference is made to FIG. 13 of the drawings. In describing FIG. 13, the letters A through C in parentheses in the text match the view letters A through C in FIG. 13. (A) Place the body 74A-1 of the type 1 gear 74A, and gear body 74B-1 of the type 2 gear 74B so that they are 180 degrees out of phase from their position in FIG. 12 of the drawings, and draw circle 77P with radius Rt, which is half the width of the planned tooth width, with its center at point P, shared by the peripheries of both 74A and 74B gear bodies. (B) Draw circles of radius, Rt, next to each other with no space in between and with the center of each circle on the peripheries of the gears, such that neighboring circles intersect at two points, (points 180 and 181 shown in FIG. 14) one of which points (point 180) is on the periphery of the gear body, or pitch line, of each gear. (C) Identify every other circle in each gear body periphery as a solid line for gear teeth and alternate circles as a dotted line for gaps between teeth.

Reference is now made to FIG. 14 of the drawings showing an expanded view of two neighboring circles with their centers on 100A and 102A, wherein circle 77A is on the periphery 100A of gear body 74A-1, and circle 79A is on the periphery 102A of gear body 74B-1. Circles 77A and 79A intersect at 180, which is on the pitch line 102A, and at 181. The straight line 203 connecting centers 200A and 201A of circles 77A and 79A, respectively, intersects with circle 79A at point 183 and with circle 77A at 186 as shown in the inserted enlarged view. The line 102B represents the trajectories of the maximum overlapping points, such as 183 and 186, and is identified as base line of gear 74B. The line 100B, which is drawn in a similar manner, is identified as base line of gear 74A. An involute or similar curve 77C1 that forms a side of a tooth in gear 74A starts at point 184 (which is not on circle 77A) on line 100B, and intersects with line 100A at point 182, which is on circle 77A. Similarly, an involute or similar curve 79C1 that forms a side of a tooth in gear 74B starts at point 187 in the inserted enlarged view (which is not on circle 79A) on line 102B, and intersects with line 102A at 180, which is on circle 79A. In FIG. 14, Lines 77C1 and 79C1 contact each other at 183A. 77C1 and 79C1 each may comprise two or more curve segments of different mathematical characteristics. The involute or similar curve 77C1 is terminated at an arbitrary point 183B which is on or within circle 77A. Similarly, the involute or similar curve 79C1 is terminated at an arbitrary point 180B which is on or within circle 79A. The points of termination 180B and 183B of the involute or similar curves 77C1 and 79C1 are the boundaries of the side and the top segments of gear teeth. Geometries of the curves 77C1 and 79C1 are selected to satisfy the condition such that curves 77C1 and 79C1 will generally in contact to each other while they travel the distance of a full gear tooth width (i.e., 201 to 200A in FIG. 14).

The gear teeth in the completed gear design are shown in FIG. 15 of the drawings. Surface of gear tooth 77 of gear 74A comprises two sides 77C1 and 77C2 and top 77C3, and surface of gear tooth 79 of gear 74B comprises two sides 79C1 and 79C2, and top 79C3. The top surface 77C3 of gear tooth 77A is within circle 77A, and the top surface 79C3 of gear tooth 79A is within circle 79A in FIG. 14. A gap between neighboring gear teeth 77 is shown as 77D, and a gap between neighboring gear teeth 79 is shown as 79D. The boundary between a gear tooth side 79C1 and gap 79D is shown by point 187 in the inserted enlarged view. The curves forming gaps 77D and 79D are arbitrary curves that do not cause interference of gear teeth.

Figure 16:
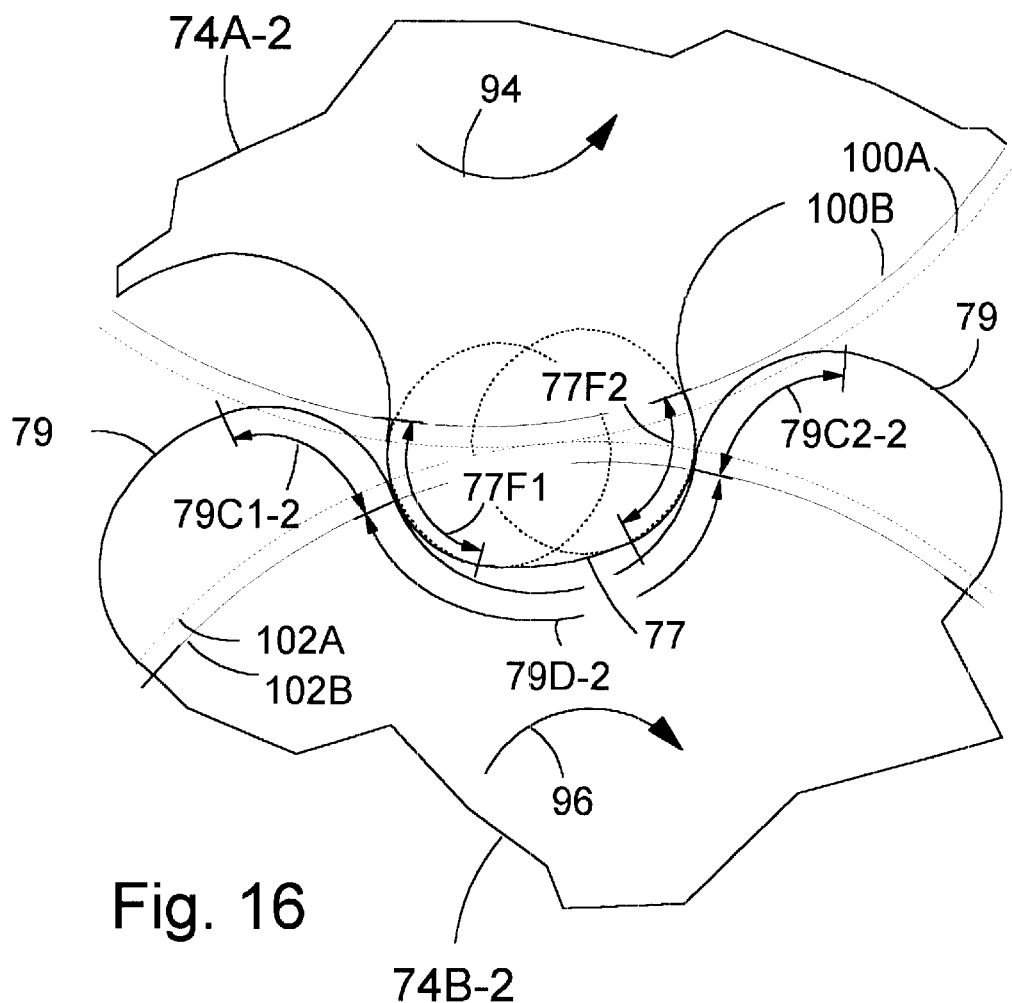
FIG. 16 is an enlarged view showing the meshing of modified type 1 and type 2 gears.

FIG. 16 of the drawings shows a modified gear tooth design wherein the involute or similar curve 77C1 shown in FIG. 15 is replaced by a circular arc 77F1, and the involute or similar curve 77C2 is replaced by another circular arc 77F2. The geometric designs of the corresponding gear tooth arcs 79C1-2 and 79C2-2 must be adjusted to accommodate the circular geometries of gear tooth arcs 77F1 and 77F2. This is the basis for an alternative gear set design, in which one of the gears will have rollers instead of teeth.

Reference now is made to FIGS. 17 and 18 of the drawings, wherein an alternative gear set 120 comprising a modified form of the type 1 gear 120A and corresponding type 2 gear 120B is shown, which gear set may be used in place of gear sets 74 and 76. The type 1 gear 120A is shown affixed to tubular shaft 82, which, in turn, is rotatably supported on shaft 86, rotatable about shaft axis 88, in the manner of gear set 74 shown in FIG. 12. Similarly, type 2 gear 120B is shown attached to shaft 68 rotatable about axis 90. In this embodiment, the type 1 gear 120A uses rollers and the type 2 gear 120B uses a nonroller gear tooth design. Rollers 132A of the type 1 gear mesh only with gear teeth 124A of the type 2 gear and rollers 132B mesh only with gear teeth 124B.

Having two rollers in the same plane is not feasible, so gears 120A and 120B are split into two one-sided gears, each gear having teeth for meshing only on one side. That is, each gear's teeth of the two one-sided gears are angularly offset so that the two one-sided gears mesh only on one side to function as one gear set.

FIG. 18 shows that type 1 gear 120A comprises one-sided gears 120AA and 120AB with rollers 132A and 132B sandwiched between walls 128. Gear teeth in the form of rollers 132A and 132B are located on the periphery of the gear and are rotatably supported on axles 134A and 134B extending between the gear walls 128. The type 2 gear 120B comprises one-sided gears 120BA and 120BB with gear teeth 124A and 124B attached with connecting piece 126. Rollers 132A and 132B are adapted for engagement with teeth 124A and 124B, respectively, formed about the periphery of the type 2 gear. Gear tooth 132A of type 1 one-sided gear 120AA and gear tooth 124A of type 2 one-sided gear 120BA, and gear tooth 132B of type 1 one-sided gear 120AB and gear tooth 124B of one-sided gear 120BB continuously contact each other while they travel one full gear tooth width in the vicinity of the contact point.

Gear sets that include a combination of nonroller gear teeth and roller types of teeth may be used. For example, the circular arc sections of gears 120A and 120B may be provided with nonroller gear teeth in place of the illustrated roller types of teeth 132A and 132B on gear 120A and associated teeth 124A and 124B on gear 120B.

Asymmetric Type 1 and Type 2 Gears

Figure 20:
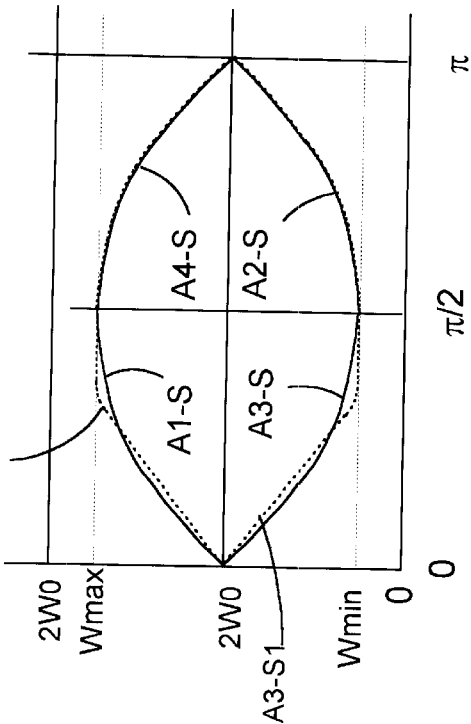
FIG. 20 is a diagram showing the rotational speed profile of type 1 and type 2 gears.
Figure 19:
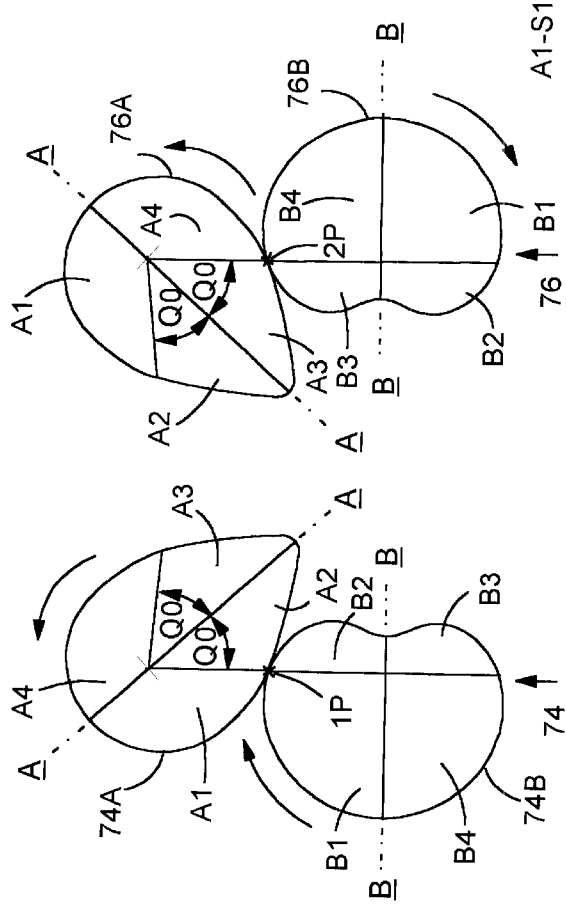
FIG. 19 is a diagram of type 1 and type 2 gears with no gear teeth shown.

Reference now is made to FIG. 19 of the drawings, comprising type 1 gears 74A and 76A, each having gear segments A1, A2, A3, and A4 and type 2 gears 74B and 76B, each having gear segments B1, B2, B3, and B4, wherein segment A1 meshes with B1, A2 with B2, A3 with B3, and A4 with B4. The four segments in type 1 gear 74A and 76A are defined in such a manner that at the boundary of A1 and A2, denoted by 1P in FIG. 19, the rotational speed of the type 1 gear equals the rotational speed of the type 2 gear; at the boundary of A2 and A3, the rotational speed of the type 1 gear is the minimum; at the boundary of A3 and A4, denoted by 2P in FIG. 19, the rotational speed of the type 1 gear equals the rotational speed of type 2 gear; and at the boundary of A4 and A1, the rotational speed of the type 1 gear is the maximum. Speed profiles of these four segments of type 1 gears (i.e., A1, A2, A3, and A4) are denoted by A1-S, A2-S, A3-S, and A4-S, respectively, in FIG. 20. In FIG. 20, x-axis is the rotational angle of the type 2 gears 74B and 76B, and the y-axis is the rotational speeds of the type 1 and type 2 gears. The rotational angle of gears 74B and 76B is zero when gear set 74 is meshing at 1P, and gear set 76 is meshing at 2P. Type 1 and type 2 gears are not necessarily symmetric to A—A and B—B. It must satisfy, however, in addition to the condition given in Equation (1), the angle traveled by the type 1 gear in A1 equals the angle traveled by the type 1 gear in A4, and the angle traveled by the type 1 gear in A2 equals the angle traveled by type 1 gear in A3, both under constant speed operation of the type 2 gear. For example, a type 1 gear that causes speed profiles A1-S1, A2-S, A3-S1, and S4-S shown in dotted line in FIG. 20 satisfying the above conditions is a valid design.

Operation of the Engine

Figure 21:
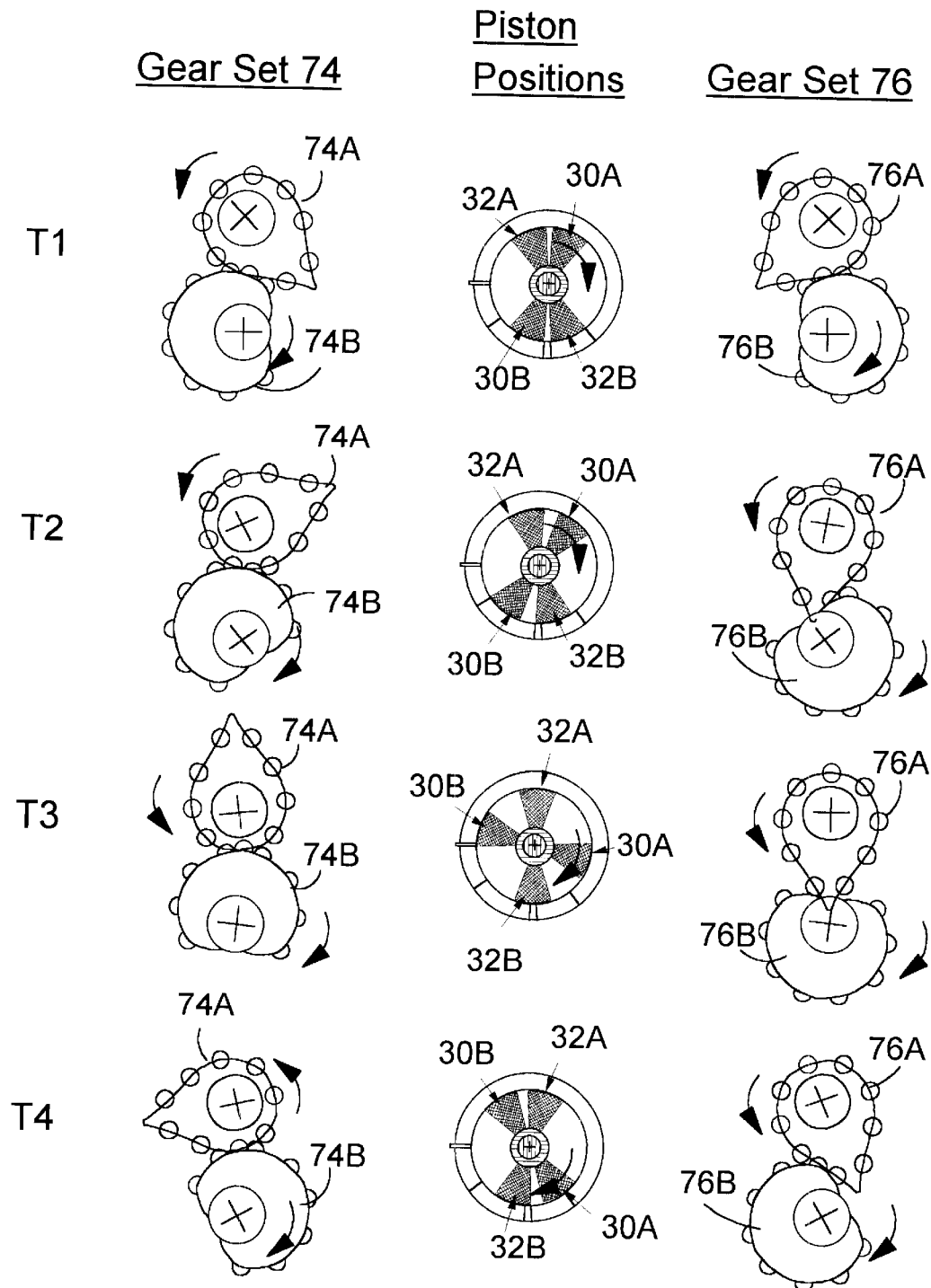
FIG. 21 is a diagram showing the relationship between piston positions and type 1 and type 2 gear positions.
Figure 22:
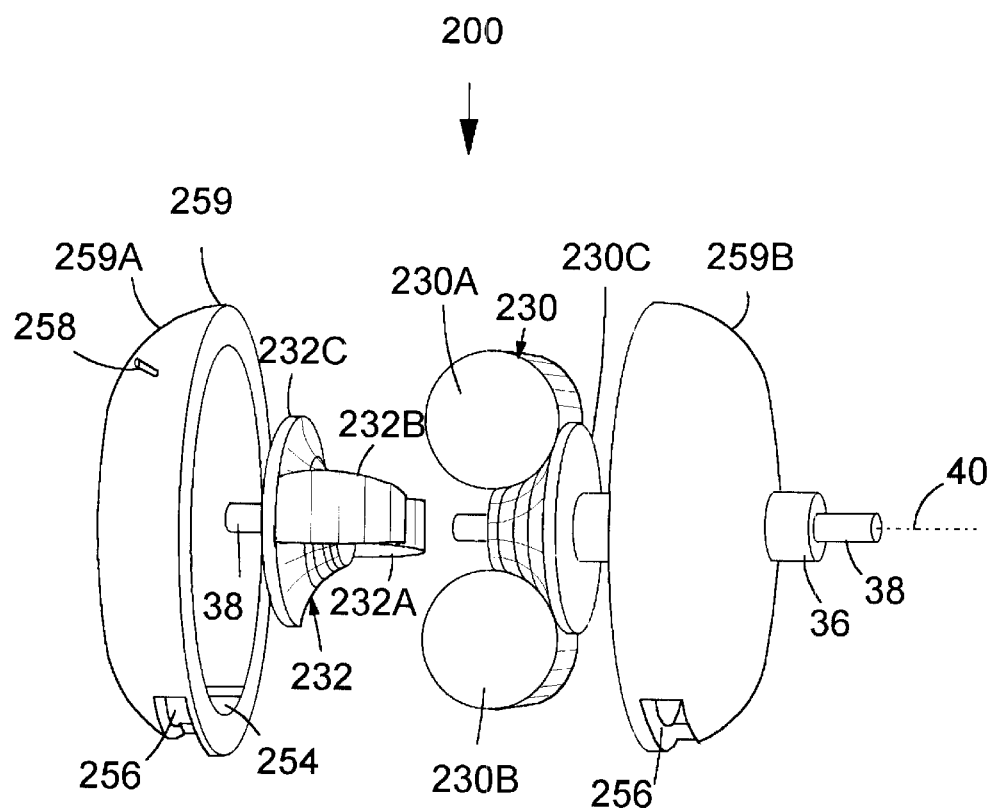
FIG. 22 is an exploded isometric view of a rotary piston engine's working chamber in an alternative embodiment of the present invention.
Figure 23:
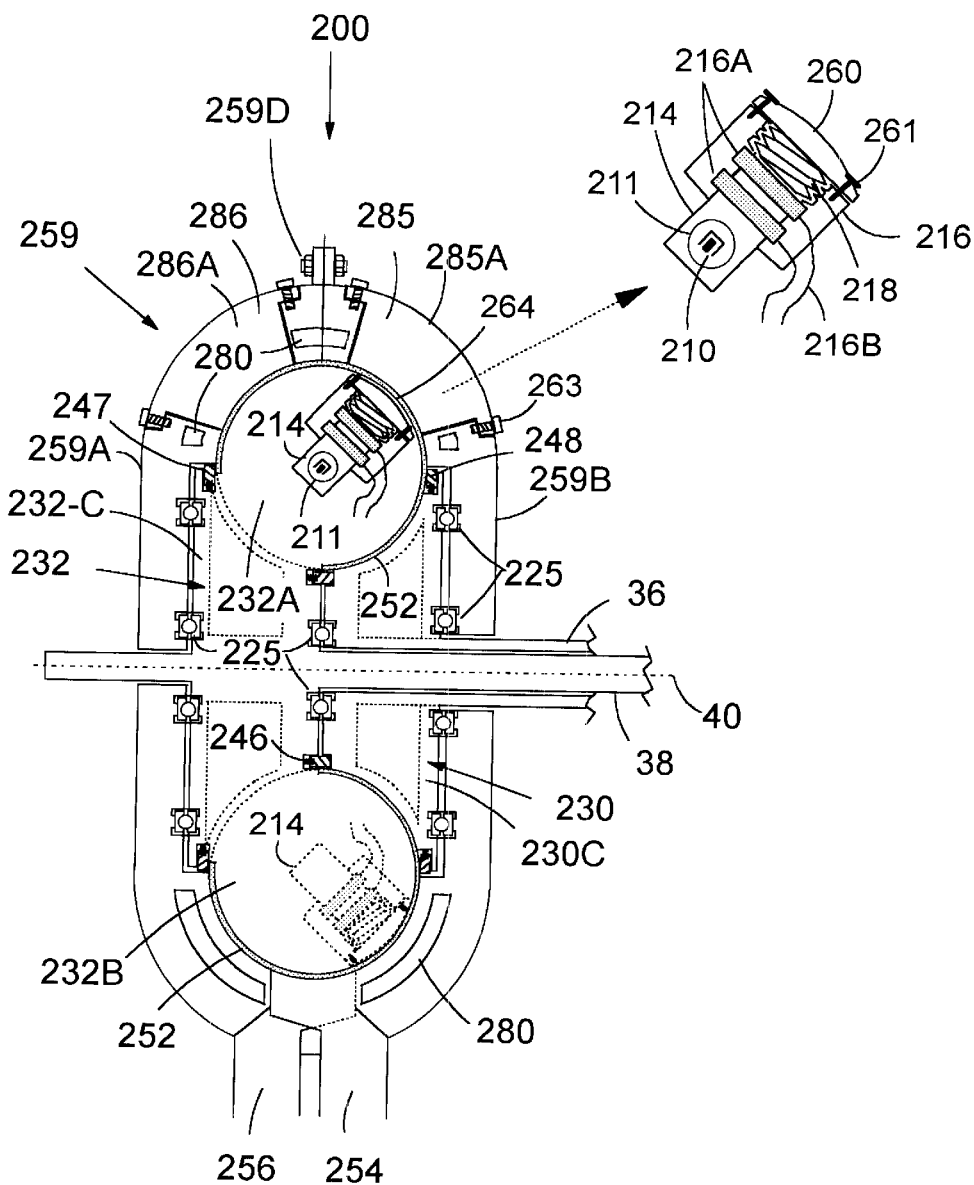
FIG. 23 is a cross-sectional view of an alternative design of the engine's working chamber.

Operation of the novel engine of this invention will best be understood with reference also to FIGS. 21 and 7. Reference first is made to FIG. 21 wherein sequential operating positions of the engine pistons and gear sets 74 and 76 at four time points T1 through T4 are schematically illustrated, and functions at the four engine subchambers are identified. Each subchamber is identified by the leading and trailing pistons of the subchamber.

In the illustrated engine operation, fuel is injected during the compression phase. Alternatively, fuel may be injected at the end of the compression phase. Furthermore, a fuel/air mixture may be supplied to the engine through the inlet port, in which case no fuel injection means are required.

FIG. 21 shows the angular positions of the piston assemblies 30 and 32 and gear sets 74 and 76 of a four-piston engine during almost one revolution of the piston assemblies. Since the gear sets 74 and 76 are connected to the piston assemblies through circular gear pairs 70 and 72 having a 1:2 gear ratio, in the four-piston design the type 1 gears 74A and 76A and type 2 gears 74B and 76B complete two revolutions for each revolution of the piston assemblies and output shaft 86 also completes two revolutions for each revolution of the piston assemblies.

In FIG. 21, at T1, pistons 30A and 32A are at their closest positions and subchamber 30A-32A is at its minimum volume; ignition has already taken place in subchamber 30A-32A. The exhaust of spent gases starts through the exhaust port at subchamber 32B-30A. The power and exhaust phases occurring at the respective subchambers 30A-32A and 32B-30A continue from time point T1 through time point T4 of the engine cycle in FIG. 21. Fuel is injected into subchamber 32A-30B at some point in piston travel. The exhaust port may be cut wider than the piston width to allow for the exhaust of spent gases before time point T1. Spark ignition timing may be advanced or delayed as required.

At T1 in FIG. 21, gear sets 74 and 76 are both rotating at the same speed. Reference is now also made to FIG. 7 a diagram showing the rotational speed profiles of gears 74A and 76A and interconnected gears 74B and 76B. In FIG. 7, the rotational speeds of type 1 gears 74A and 76A are identified by reference characters 74A-S and 76A-S, respectively, and the rotational speeds of type 2 gears 74B and 76B are identified by reference characters 74B-S and 76B-S, respectively. In FIG. 7, times T1 to T4 are shown, which correspond to times T1 to T4 in FIG. 21. As seen in FIG. 7, at time T1, the type 1 and type 2 gears are rotating at speed W0. During the time period between T1 and T2 of FIG. 7, the rotational speed of gear 74A increases, while the rotational speed of gear 76A decreases. At time T2 in FIG. 21, compression and intake start in subchambers 32A-30B and 30B-32B, respectively. Expansion and exhaust activities have been in progress. During the time period between T2 and T3 of FIG. 7, the rotational speed of gear 74A further increases and reaches the maximum speed, Wmax, while the rotational speed of gear 76A further decreases and reaches the minimum speed, Wmin. By time T3 of FIG. 7, both gear sets 74 and 76 have reached constant rotational speed and have been rotating at those constant speeds for a while. Type 1 gears 74A and 76A are rotating at speed Wmax and Wmin, respectively, at time T3 shown in FIG. 7. The rotational speed 74A-S of type 1 gear 74A decreases, and simultaneously, the rotational speed 76A-S of type 1 gear 76A increases between times T3 and T4. At time T4 of FIG. 21, ignition takes place in subchamber 32A-30B, in preparation for the next cycle.

FIGS. 24A and 24B of the drawings show, using mathematical notations and commonly used Greek letters for some variables and constants, aforementioned Equations (1) through (12). The invention having been described in detail in accordance with the requirements of the U.S. Patent Statutes, various other changes and modification will suggest themselves to those skilled in this art. For example, the shape of the piston surface may be made rectangular or square instead of circular as described in the present invention, and the shape of the working chamber may be cylindrical instead of toroidal. The engine described in this invention may be also used in diesel engines. Number of pistons attached to a piston assembly may not be limited to four or eight: As many pistons as desired may be attached to a piston assembly as long as gear set 70 and 72 shown in FIG. 1 is adjusted to a proper rotation ratio; i.e., 2:1 in the four-piston engine, 4:1 in the eight-piston engine, etc., and the number of pistons attached to a piston assembly is a multiple of four. The use of the specified gear teeth is not required for operation of the engine. It is intended that the above and other such changes and modifications shall fall within the spirit and scope of the invention defined in the appended claims.

I claim:

1. A mechanism for interconnecting first and second inputs for non-intermittent variable-speed rotation of said first and second inputs comprising first and second gear sets each of which includes a pair of intermeshing noncircular Sakita type 1 and type 2 gears, means for rotatably coupling said Sakita type 1 gears of said first and second gear sets to the respective said first and second inputs, and means for connecting said Sakita type 2 gears of said first and second gear sets to each other for simultaneous rotation thereof in an out-of-phase relationship, wherein said Sakita type 1 gears of first and second piston assemblies do not stop rotation at any moment while in operation, said interconnecting means includes first and second gear sets, each of which gear set comprises noncircular Sakita type 1 and type 2 gears, wherein radius Y1 of circular arc segment of said Sakita type 1 gear, in which said Sakita type 1 gear operates at maximum speed, is defined as $Y1=D/(2+\text{alpha})$, radius Y2 of circular arc segment of said Sakita type 1 gear, in which said Sakita type 1 gear operates at minimum speed, is defined as $Y2=D/(2-\text{alpha})$, radius X1 of circular arc segment of said Sakita type 2 gear, in which said Sakita type 2 gear meshes with Sakita type 1 gear operating at maximum speed, is defined as $X1=D(1+\text{alpha})/(2+\text{alpha})$, and radius X2 of circular arc segment of said Sakita type 2 gear, in which said Sakita type 2 gear meshes with Sakita type 1 gear operating at minimum speed, is defined as $X2=D(1-\text{alpha})/(2-\text{alpha})$, wherein D=distance between the centers of the rotational axes of said Sakita type 1 and type 2 gears, wherein alpha=(W0−Wmin)/W0, wherein W0=rotational speed of said type 2 gear, and Wmin=minimum rotational speed of said Sakita type 1 gear, in the noncircular curve segments of said Sakita type 1 gear, the distance between the rotational center and the point of contact with said Sakita type 2 gear varies from Y1 to Y2, and Y2 to Y1, In the noncircular curve segments of said Sakita type 2 gear, the distance between the rotational center and the point of contact with said Sakita type 1 gear varies from said X1 to said X2 and said X2 to said X1, and rotational speed profile of said Sakita type 1 gear, expressed as a function of rotational angle of said Sakita type 2 gear includes a nonlinear segment in at least one of its noncircular segments.

2. The mechanism defined in claim 1 wherein geometry of a noncircular segment of said Sakita type 1 gear is mathematically defined as $$Qy=[Q1/(pi)][a\ cos(beta)]+(alpha)[Q1/(pi)]sin[a\ cos(beta)]$$

wherein beta=(D−2y)/[(alpha)y] and a cos=arc cosine, and, geometry of a noncircular segment of said Sakita type 2 gear is mathematically defined as $$x=D\{1+(alpha)cos[Q(pi)/Q1]\}/\{2+(alpha)cos[Q(pi)/Q1]\}$$

wherein alpha=(W0−Wmin)/W0,

D=Distance between the rotational centers of said Sakita type 1 and type 2 gears y=Varying radius of said Sakita type 1 gear—distance between the rotation center and the point of contact with said Sakita type 2 gear, W0=Rotational speed of said Sakita type 2 gear, Wmin=Minimum rotational speed of said Sakita type 1 gear, Q1=Total rotational angle of said Sakita type 1 gear in a noncircular segment and also total rotational angle of said Sakita type 2 gear in a noncircular segment Qy=Rotational angle of said Sakita type 1 gear measured from the end of the circular segment with smaller radius of said Sakita type 1 gear, x Varying radius of said Sakita type 2 gear—distance between the rotation center and the point of contact with said Sakita type 1 gear, and Q=Rotational angle of said Sakita type 2 gear measured from the end of the circular segment with larger radius of said Sakita type 2 gear.

3. The mechanism as defined in claim 1 including differential means having first and second inputs and an output, said first and second inputs being attached to said Sakita type 1 gears of said first and second gear sets, respectively, and means for rotatably coupling said differential means output to said Sakita type 2 gears for simultaneous rotation thereof.

4. The mechanism as defined in claim 1 wherein said Sakita type 1 and type 2 gears having gear teeth, the surface of each of which tooth is within the confinement of an imaginary circle with a radius of half the gear tooth width with its center on mathematically defined peripheries of gear bodies of type 1 and type 2 gears.

5. A mechanism defined in claim 1 wherein one of said Sakita gears includes rollers about the periphery thereof and the other gear of said Sakita gears includes teeth about the periphery thereof, and said Sakita gear with rollers comprises a pair of one-sided gears with rollers, and said Sakita gear with gear teeth comprises a pair of one-sided gears with gear teeth, each of said one-sided gears with teeth is engageable with each of said one-sided gears with rollers only at one side of each tooth.

* * * * *